US 11,405,935 B2

(12) United States Patent
Paycher et al.

(10) Patent No.: US 11,405,935 B2
(45) Date of Patent: *Aug. 2, 2022

(54) OPTIMIZED BLUETOOTH SCHEDULING FOR ACCESSORY DEVICES

(71) Applicant: Apple Inc., Cupertino, CA (US)

(72) Inventors: Alon Paycher, Beit Hananya (IL); Sriram Hariharan, San Jose, CA (US); Yonathan Shavit, Sunnyvale, CA (US); Assaf Kaplan, Holon (IL)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/093,561

(22) Filed: Nov. 9, 2020

(65) Prior Publication Data
US 2021/0185701 A1 Jun. 17, 2021

Related U.S. Application Data

(63) Continuation of application No. 15/947,466, filed on Apr. 6, 2018, now Pat. No. 10,834,738.
(Continued)

(51) Int. Cl.
H04W 4/00 (2018.01)
H04W 72/12 (2009.01)
(Continued)

(52) U.S. Cl.
CPC ... *H04W 72/1205* (2013.01); *H04W 72/1215* (2013.01); *H04W 76/15* (2018.02);
(Continued)

(58) Field of Classification Search
CPC .......... H04W 72/1215; H04W 72/00; H04W 72/0446; H04W 4/80; H04W 4/00; H04W 84/12; H04W 84/10
See application file for complete search history.

(56) References Cited

U.S. PATENT DOCUMENTS 8,036,170 B1 10/2011 Tran et al.
2009/0129367 A1 5/2009 Bitran
(Continued)

FOREIGN PATENT DOCUMENTS

CN 101453409 A 6/2009
EP 3122132 A1 1/2017
(Continued)

OTHER PUBLICATIONS

Chinese Application No. 201810555364.4—First Office Action dated Oct. 9, 2020.
(Continued)

*Primary Examiner* — Abdelillah Elmejjarmi
(74) *Attorney, Agent, or Firm* — Dickinson Wright RLLP

(57) ABSTRACT

Communication between a source device and one or more pairs of accessory devices and between accessory devices within pairs of accessory devices is scheduled using slot availability masks (SAMs). A primary accessory device provides to the source device information about requirements for communication between the primary accessory device and a secondary accessory device. The source device determines a SAM map that specifies a periodic cycle of time slots, with time slots marked as available or unavailable for transmission and/or reception. The SAM map satisfies requirements to avoid collisions between communication between the source device and the accessory devices and communication between accessory devices within pairs of accessory devices. When multiple pairs of accessory devices establish connections with the source device, internal communication between accessory devices within pairs of accessory devices are aligned to use at least a common overlapping set of time slots.

20 Claims, 12 Drawing Sheets

Related U.S. Application Data

(60) Provisional application No. 62/514,713, filed on Jun. 2, 2017.

(51) Int. Cl.
| | | |
|---|---|---|
| *H04W 76/15* | (2018.01) | |
| *H04W 88/06* | (2009.01) | |
| *H04W 84/18* | (2009.01) | |
| *H04W 72/04* | (2009.01) | |

(52) U.S. Cl.
CPC ........ *H04W 72/0446* (2013.01); *H04W 84/18* (2013.01); *H04W 88/06* (2013.01)

(56) References Cited

U.S. PATENT DOCUMENTS

| | | | |
|---|---|---|---|
| 2012/0188907 A1* | 7/2012 | Dayal | H04W 72/1215 370/254 |
| 2013/0260686 A1 | 10/2013 | Mukherjee | |
| 2014/0256334 A1 | 9/2014 | Kazmi et al. | |
| 2014/0286293 A1 | 9/2014 | Jang et al. | |
| 2015/0057006 A1 | 2/2015 | Gao et al. | |
| 2017/0027015 A1 | 1/2017 | Wijesinghe et al. | |
| 2017/0093079 A1 | 3/2017 | Wagman et al. | |
| 2017/0094677 A1 | 3/2017 | Liu et al. | |
| 2017/0111918 A1 | 4/2017 | Jechoux et al. | |
| 2018/0091929 A1* | 3/2018 | Bi | H04W 72/1257 |
| 2018/0352558 A1 | 12/2018 | Paycher et al. | |

FOREIGN PATENT DOCUMENTS

| | | |
|---|---|---|
| JP | 2010535461 A | 11/2010 |
| JP | 2015185961 A | 10/2015 |
| JP | 2017098943 A | 6/2017 |
| KR | 1020130121943 A | 11/2013 |
| WO | 2009018361 A1 | 2/2009 |
| WO | 2012099939 A1 | 7/2012 |
| WO | 2013067686 A1 | 3/2013 |
| WO | 2013048296 A1 | 4/2013 |
| WO | 2015166624 A1 | 11/2015 |
| WO | 2017074298 A1 | 5/2017 |

OTHER PUBLICATIONS

"Bluetooth Core Specification v 5.0, Master Table of Contents & Compliance Requirements: Specification vol. 0," Bluetooth SIG Proprietary, Dec. 6, 2016, 157 pages.

"Bluetooth Core Specification v 5.0, Architecture & Terminology Overview: Specification vol. 1," Bluetooth SIG Proprietary, Dec. 6, 2016, 159 pages.

"Bluetooth Core Specification v 5.0, Core System Package [BR/EDR Controller volume]: Specification vol. 2," Bluetooth SIG Proprietary (Part ABCD), Dec. 6, 2016, 339 pages.

"Bluetooth Core Specification v 5.0, Core System Package [BR/EDR Controller volume]: Specification vol. 2," Bluetooth SIG Proprietary (Part E), Dec. 6, 2016, 752 pages.

"Bluetooth Core Specification v 5.0, Core System Package [BR/EDR Controller volume]: Specification vol. 2," Bluetooth SIG Proprietary (Part FGH), Dec. 6, 2016, 302 pages.

"Bluetooth Core Specification v 5.0, Core System Package [Host volume]: Specification vol. 3," Bluetooth SIG Proprietary, Dec. 6, 2016, 685 pages.

"Bluetooth Core Specification v 5.0, Host Controller Interface: Specification vol. 4," Bluetooth SIG Proprietary, Dec. 6, 2016, 73 pages.

"Bluetooth Core Specification v 5.0, Core System Package [AMP Controller volume]: Specification vol. 5," Bluetooth SIG Proprietary, Dec. 6, 2016, 61 pages.

"Bluetooth Core Specification v 5.0, Core System Package [Low Energy Controller volume]: Specification vol. 6," Bluetooth SIG Proprietary, Dec. 6, 2016, 263 pages.

"Bluetooth Core Specification v 5.0, Core System Package [Wireless Coexistence volume]: Specification vol. 7," Bluetooth SIG Proprietary, Dec. 6, 2016, 32 pages.

"Supplement to the Bluetooth Core Specification: Specification of the Bluetooth System, CSS Version 7," Bluetooth SIG Proprietary, Dec. 6, 2016, 37 pages.

European Patent Application No. 18174109.1—Extended European Search Report dated Oct. 10, 2018.

Japanese Patent Application No. 2018-105878—Official Action dated Feb. 25, 2019.

Korean Patent Application No. 10-2018-0062859—Notice of Preliminary Rejection dated Aug. 20, 2019.

Indian Patent Application No. 201814020338—First Examination Report dated May 22, 2020.

\* cited by examiner

OPTIMIZED BLUETOOTH SCHEDULING FOR ACCESSORY DEVICES

CROSS-REFERENCE TO RELATED APPLICATIONS

The present application is a continuation of U.S. application Ser. No. 15/947,466, filed Apr. 6, 2018, entitled "OPTIMIZED BLUETOOTH SCHEDULING FOR ACCESSORY DEVICES," set to issue Nov. 10, 2020 as U.S. Pat. No. 10,834,738, which claims the benefit of U.S. Provisional Application No. 62/514,713, filed Jun. 2, 2017, entitled "OPTIMIZED BLUETOOTH SCHEDULING FOR ACCESSORY DEVICES," the contents of all of which are incorporated by reference herein in their entirety for all purposes.

FIELD

The described embodiments set forth techniques for scheduling communication for devices in a wireless personal area network (WPAN), including optimizing Bluetooth® (BT) connections between a source device and one or more sets of accessory devices.

BACKGROUND

Wireless communication capabilities continue to be added to a broad array of devices, including accessory devices configurable to pair with source devices. For example, wireless audio reproduction devices, such as wireless ear buds, can connect to a source device, such as a media streaming capable smart phone, tablet, portable computer, or other wireless-capable computing device to receive an audio stream via a WPAN connection, such as via a Bluetooth connection. The wireless ear buds can also communicate with each other via a separate WPAN connection, such as another Bluetooth connection. The two Bluetooth connections can form a scatternet in which the source device can communicate with one or both of the wireless ear buds via a first Bluetooth connection, and the wireless ear buds can communicate with each other via a second Bluetooth connection. When the wireless ear buds are communicating with each other, the wireless ear buds can be unable to receive audio packets for the audio stream from the source device, which can lead to retransmissions of the audio packets. High rates of retransmission of the audio packets can reduce available bandwidth in a shared radio frequency (RF) band, such as the 2.4 GHz industrial, scientific, and medical (ISM) band, which can affect performance of audio reproduction or otherwise impact communication by the source device with other wireless devices that share the same RF band as the first Bluetooth connection.

SUMMARY

The embodiments described herein relate to scheduling communication between multiple electronic devices across different communication links to reduce overlap in shared communications bands, including optimized scheduling of communication among multiple WPAN connections between a source device and one or more sets of accessory devices. Communication for a set of communication links is scheduled to improve performance based on the use of slot availability masks (SAMs). A source device can communicate with a pair of (or with multiple pairs of) accessory devices, where accessory devices in each pair of accessory devices also communicate with each other using the same radio frequency band as used for communication with the source device. A primary accessory device of the pair of accessory devices provides to the source device information about requirements for communication between the primary accessory device and a secondary accessory device. The source device determines a SAM map that specifies a periodic cycle of time slots, with each time slot marked as available or unavailable for transmission for communication from the source device to the primary accessory device and for reception of communication from the primary accessory device to the source device. The SAM map can satisfy requirements to avoid collisions between communication between the source device and the accessory devices and communication between the accessory devices within each pair of accessory devices. A first set of consecutive time slots is allocated for internal communication between accessory devices in each pair of accessory devices, and a guard period of a second set of consecutive time slots precedes the first set of consecutive time slots. The guard period ensures that multi-slot packets and/or retransmissions of packets sent by the source device to the accessory devices do not overlap with communication between the accessory devices during the first set of consecutive time slots. Multiple pairs of accessory devices can establish connections with the source device, and internal communication between accessory devices within each pair of accessory devices are aligned to use the same (or at least an overlapping set) of time slots within a repeated cycle of time slots.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
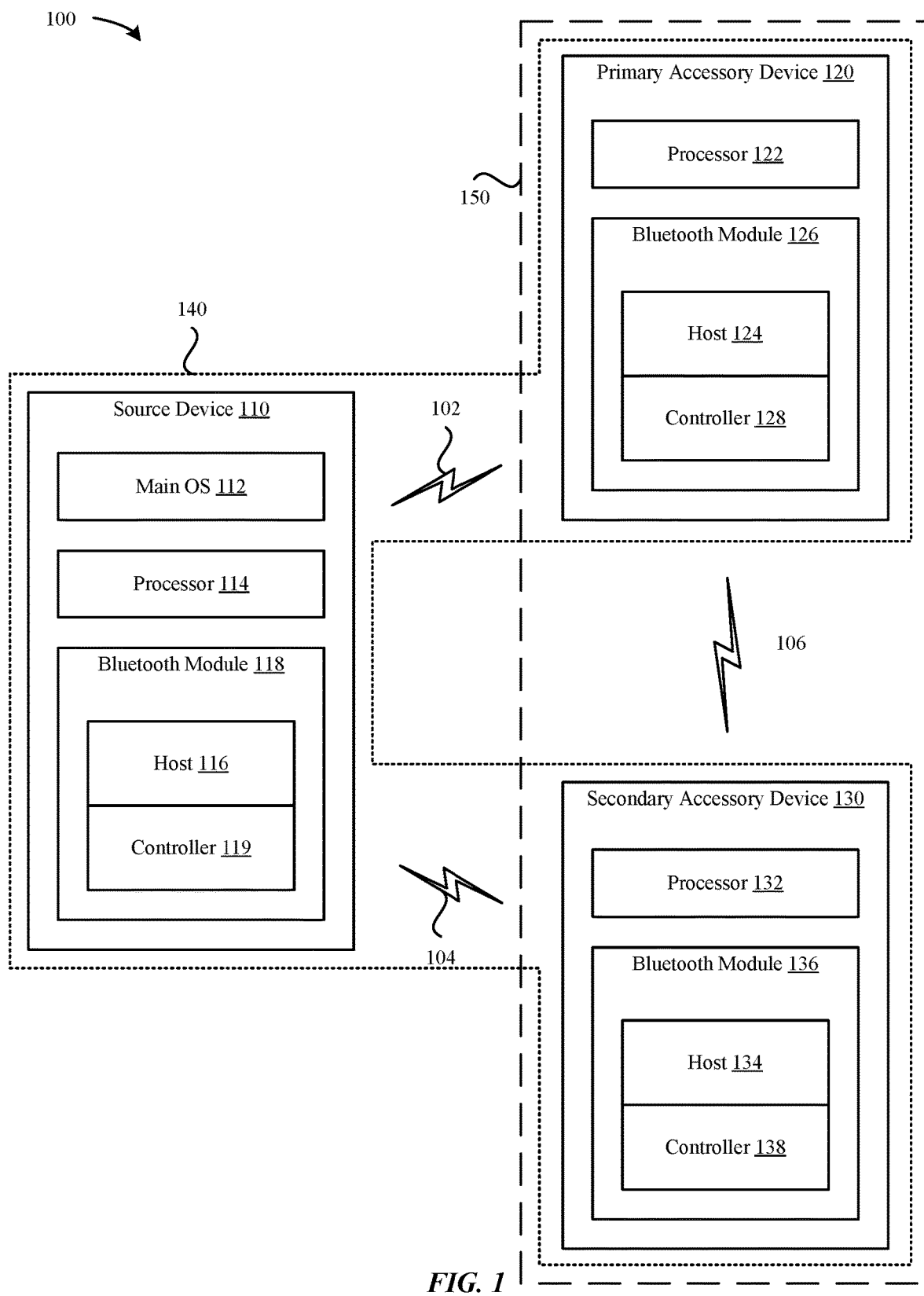
FIG. 1 illustrates a block diagram of select exemplary components of electronic devices to implement various techniques described herein in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

Wireless communication capabilities are available in a broad array of accessory devices that can be configurable to communication with source devices, such as wireless media streaming capable source devices. For example, wireless audio reproduction devices, such as a pair of wireless ear buds, can connect via a wireless personal area network (WPAN) connection to a source device in order to receive an audio stream, such as via an Advanced Audio Distribution Profile (A2DP) connection of a Bluetooth communication protocol, as part of a first piconet. The source device can act as a master device for the first piconet, while a first wireless ear bud of the pair of wireless ear buds can act as a slave device for the first piconet. The pair of wireless ear buds can also be connected to each other, e.g., in order to communicate signaling messages, as part of a second piconet. The first wireless ear bud can act as a master device for the second piconet, while the second wireless ear bud can act as a slave device for the second piconet. As such, the first wireless ear bud must determine, for a given time slot, which piconet to serve, e.g., whether to communicate with the source device on the first piconet or to communicate with the second wireless ear bud on the second piconet. When the first and second wireless ear buds are communicating between each other, they can be unavailable to receive communication, such as audio stream packets, from the source device. When the source device is not aware of timing for communication between the first and second wireless ear buds, audio packets may be transmitted that cannot be received. Such audio packets require retransmission, which can reduce the available bandwidth on a shared radio frequency (RF) band used by both piconets, as well as for other communications. For example, when the source device and/or the wireless ear buds include wireless communication capabilities via another wireless communication protocol that operates in the same RF band as the piconets, communication using the other wireless communication protocol by the source device and/or the wireless ear buds can also be impacted by the reduction in available bandwidth in the shared RF band. The performance of communication of the audio stream from the source device to the either or both of the wireless ear buds in a pair of wireless ear buds to provide high quality audio can be affected, as can be communication using a Wi-Fi protocol to other wireless devices.

Scheduling of communication for one or more of the piconets to improve performance can be based on the use of slot availability masks (SAMs), as introduced in the Bluetooth 5.0 wireless communication protocol specified by the Bluetooth Special Interest Group (SIG). The source device can agree with the wireless ear buds, e.g., with the first wireless ear bud, on a periodic set of time slots reserved for communication between the wireless ear buds. The periodic set of time slots can occur as part of a periodic cycle of communication, where each time slot in the periodic cycle can be configured to allow (or equivalently disallow) particular types of communication to avoid conflicting communication requirements in each of the piconets. By scheduling a set of time slots dedicated for communication in the second piconet, and additionally providing guard periods before the set of time slots to avoid overlapping communication due to retransmissions and/or due to multi-slot packets, the source device can reduce conflicting communications and improve throughput, as the source device can know precisely in which time slots the wireless ear buds are communicating with each other.

The primary wireless ear bud can provide information about requirements for communication between the primary wireless ear bud and the secondary wireless ear bud to the source device. In some embodiments, the information about requirements for communication can be provided using a SAM that indicates a periodic cycle of time slots, with time slots marked as available or unavailable for communication between the primary wireless ear bud and the source device (e.g., transmission of communication from the primary wireless ear bud to the source device and/or reception of communication from the source device by the primary wireless ear bud). In some embodiments, the information for requirements for communication can be provided by indicating a time period, e.g., a number of consecutive time slots, required for dedicated communication between the wireless ear buds during each cycle of a repeated cyclic time period. In some embodiments, the primary wireless ear bud indicates to the source device that the primary wireless ear bud will be unavailable for communication to and from the source device at particular times, for a particular set of time slots, and/or for a particular time period during a cycle that extends for a number of time slots and/or for a length of time. For example, the primary wireless ear bud can indicate a requirement for at least two (or at least four, etc.) consecutive time slots dedicated to intra-wireless ear bud communication every 56 time slots (or another positive number of time slots). In some embodiments, the primary wireless ear bud provides a first SAM to the source device, the first SAM indicating transmission/reception availability (or unavailability) from the perspective of the primary wireless ear bud for each time slot in a cycle of time slots. In some embodiments, the source device obtains the requirements for intra-wireless ear bud communication and responds with a (second) SAM that satisfies the requirements to avoid collisions between (i) communication from the source device to the wireless ear bud(s) and (ii) communication between the wireless ear buds. In some embodiments, the SAM provided by the source device includes at least a first set of consecutive time slots reserved for intra-wireless ear bud communication during a cycle of time slots. In some embodiments, the SAM also includes a guard period of a second set of consecutive time slots that immediately precede the first set of consecutive time slots, where the time slots of the guard period are unavailable for communication from the source device to the first wireless ear bud. In some embodiments, the time slots of the guard period are available for communication from the first wireless ear bud to the source device. In some embodiments, the length of the guard period is determined based at least in part on a number of time slots required to avoid multi-slot transmissions or retransmissions by the source device to the first wireless ear bud from overlapping with communication between the wireless ear buds. In some embodiments, the communication of requirements using a SAM is based at least in part on the source device obtaining an indication that the primary wireless ear bud shares a common original equipment manufacturing (OEM) identified (ID) with the source device. In some embodiments, the communication of requirements using a SAM is based at least in part on the source device obtaining an indication of any/all of a hardware version, a firmware version, and/or a software version of the wireless ear buds supporting the use of SAM to restrict communication in a piconet.

In some embodiments, a source device can connect to multiple accessory devices, which can includes multiple sets of paired accessory devices, such as multiple pairs of wireless ear buds. Each pair of wireless ear buds can require a regular time period during which to communicate with each other. With independent scheduling for multiple pairs of wireless ear buds, the source device could be blocked from transmission and/or reception over a greater percentage of time per cycle of time slots than that required for just one pair of wireless ear buds, particularly when each pair of wireless ear buds can require a similar number of time slots for internal communication. Rather than allowing multiple pairs of wireless ear buds to determine their own schedule for internal communication, the source device can coordinate the time for internal communication for multiple pairs of wireless ear buds, e.g., that are also communicating with the source device. Multiple pairs of wireless ear buds can indicate to the source device their requirements for internal communication, e.g., by providing a SAM to the source device that indicates the transmission/reception availability (or unavailability) from the perspective of the primary wireless ear buds of the respective pairs of wireless ear buds. The source device can determine a common set of time slots (or several sets of time slots) during a cycle of time slots to allocate to the corresponding pairs of wireless ear buds to be used for their internal communication. For example, the source can provide to the pairs of wireless ear buds a SAM (or multiple SAMs) that synchronizes the availability of time slots for internal communication between multiple pairs of wireless ear buds. Thus, internal communications for multiple pairs of wireless ear buds can occur during the same set of time slots for a cycle of time slots. In some embodiments, each pair of wireless ear buds requires the same number of time slots, and the source device provides a SAM that includes a set of consecutive time slots that equals or exceeds the required number of time slots for internal communication between wireless ear buds of each pair of wireless ear buds connected with the source device. In some embodiments, at least one pair of wireless ear buds requires a different number of time slots that another pair of wireless ear buds, and the source device provides a SAM that includes a set of consecutive time slots that equals or exceeds the required number of time slots for internal communication for each of the pairs of wireless ear buds. In some embodiments, the SAM further includes a set of consecutive time slots as a guard period that immediately precedes the set of time slots allocated for internal communication between wireless ear buds. In some embodiments, the set of consecutive time slots allocated for internal communication are designated as unavailable for transmission or reception for the source device. In some embodiments, the set of consecutive time slots for the guard period are designated as unavailable for transmission for the source device.

The source device can obtain from an accessory device, e.g., from one or both of a pair of wireless ear buds, requirements for internal communication between the wireless ear buds. The source device can provide back to the accessory device, e.g., to one or both of the pair of wireless ear buds an indication of a cycle of time slots that allocates a set of consecutive time slots for internal communication between the wireless ear buds. The source device can determine the requirements using a SAM received from the accessory device. The source device can provide communication restrictions on transmission to and/or reception from the source device to the accessory device, e.g., to at least one of the pair of wireless ear buds, using a SAM. When the source device is already connected to an accessory device, e.g., to at least one of a pair of wireless ear buds, and another accessory device, e.g., an additional pair of wireless ear buds connects to the source device, the source device can obtain requirements for internal communication from the additional pair of wireless ear buds. In some embodiments, when the requirements for internal communication align with a SAM already in use by the source device with the (first) pair of wireless ear buds, the source device can provide to the additional pair of wireless ear buds the SAM already in use. In some embodiments, when the requirements for internal communication among each of the pairs of wireless ear buds connected with the source device require realignment, the source device can send to each of the pairs of wireless ear buds (or to a subset of one or more of the pairs of wireless ear buds) an updated SAM that aligns the internal communication by all of the pairs of wireless ear buds to overlap during a common set of consecutive time slots during each cycle of time slots.

These and other embodiments are discussed below with reference to FIGS. 1-11; however, those skilled in the art will readily appreciate that the detailed description given herein with respect to these figures is for explanatory purposes only and should not be construed as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. In some embodiments, the WPAN technology can include a Bluetooth wireless communication subsystem or radio, and the Bluetooth radio can implement one or more versions of a Bluetooth communication protocol in accordance with a present or future developed Bluetooth Special Interest Group (SIG) technology.

Additionally, it should be understood that user equipment (UE) described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 illustrates a (simplified) block diagram 100 of several exemplary components of devices that can be configured to implement various techniques described herein. FIG. 1 illustrates an example system that includes a source device 110, a primary accessory device 120, and a secondary accessory device 130. The source device 110 can represent any form of a computing device (e.g., a smartphone, a tablet, a laptop, etc.) that is capable of interfacing with other computing devices (e.g., the primary accessory device 120 and the secondary accessory device 130) and can provide data, e.g., streaming media, to the primary accessory device 120 and the secondary accessory device 130. According to some embodiments, the primary accessory device 120 and the secondary accessory device 130 can represent peripheral devices that are capable of connecting to and communicating with the source device 110 and can receive streaming media from the source device 110. It is noted, however, that the primary accessory device 120 and the secondary accessory device 130 are not limited to representing peripheral devices, and can represent any computing device capable of implementing the techniques described herein. The primary accessory device 120 and the secondary accessory device 130 can represent a pair of peripheral devices that can pair wirelessly with the source device 110, e.g., a pair of wireless ear buds, and can communicate with each other in addition to communicating with the source device 110. In some embodiments, the primary accessory device 120 communicates bi-directionally with the source device 110 to exchange signaling commands on behalf of both the primary accessory device 120 and the secondary accessory device 130. In some embodiments, the primary accessory device 120 and the secondary accessory device 130 can exchange roles as primary and secondary devices respectively. In some embodiments, each of the primary accessory device 120 and the secondary accessory device 130 can receive streaming media from the source device 110, e.g., in parallel. In some embodiments, the primary accessory device 120 and the secondary accessory device 130 can acknowledge streaming media packets received from the source device 110, e.g., separately. In some embodiments, the primary accessory device 120 can acknowledge streaming media packets received from the source device 110 for both the primary accessory device 120 and the secondary accessory device 130.

As shown in FIG. 1, the source device 110 includes, among other components, a main operating system (OS) 112, a processor 114, and a Bluetooth module 118. The processor 114, in conjunction with a memory of the source device 110 (not illustrated in FIG. 1), can implement the main OS 112, which can be configured to execute various native OS applications and user applications, e.g., media delivery applications and wireless communication protocol stacks. Similarly, the primary accessory device 120 includes, among other components, a processor 122 and a Bluetooth module 126, and the secondary accessory device 130 includes, among other components, a processor 132 and a Bluetooth module 136. The source device 110 can communicate with the primary accessory device 120 via a wireless communication link 102 (e.g., over a wireless personal area network (WPAN) link, which can include a Bluetooth link). The source device 110 can also communicate with the secondary accessory device 130 via a wireless communication link 104 (e.g., over a wireless personal area network (WPAN) link, which can include a Bluetooth link). The wireless communication links 102 and 104 can form a WPAN network 140 (or Bluetooth network or piconet) in which the source device 110 assumes the role of a master device, and the primary accessory device 120 and the secondary accessory device 130 assume the roles of slave devices. The master device (source device 110) can manage connections with a number of slave devices to form the WPAN (Bluetooth) network 140. Furthermore, the primary accessory device 120 can communicate with the secondary accessory device 130 via a separate wireless communication link 106, e.g., over a second wireless personal area network (WPAN) link, which can include a Bluetooth link or an Untethered Protocol (UTP) link) to form a separate WPAN network 150. With respect to WPAN network 150, the primary accessory device 120 can function as a master device, while the secondary accessory device 130 can function as a slave device. Together the WPAN network 140 and the WPAN network 150 can form a scatternet of two independent WPANs (or piconets). It will be appreciated that while FIG. 1 depicts a primary accessory device 120 and a secondary accessory device 130 capable of wirelessly connecting to the source device 110, any number of one or more accessory devices can be configured to wirelessly communicate with the source device 110 without departing from the scope of this disclosure.

In some implementations, Bluetooth modules 118, 126, and 136 include respective hosts 116, 124, 134 that represent upper layers of a BT stack and controllers 119, 128, 138 that can represent lower layers of a BT stack. The hosts 116, 124, 134 can be implemented on the processors 114, 122, 132 respectively and/or on separate processors (not shown). It is also noted that the hosts 116, 124, 134 and the controllers 119, 128, 138 respectively, can represent a single processing unit (e.g., in low power devices) or separate processing units. The upper layers of the BT stack can include the Logical Link Control and Adaptation Protocol (L2CAP), the Attribute Protocol (ATT), the Generic Attribute Profile (GATT), the Security Manager Protocol (SMP) and the Generic Access Profile (GAP), which are components of the different Bluetooth protocols supported by the Bluetooth modules 118, 126, 136. The lower layers of the BT stack and include a Physical Layer (PHY), a Link Layer (LL), and a host controller interface (HCI), which also can be components of the different Bluetooth protocols supported by the Bluetooth modules 118, 126, 136. In some embodiments, hosts 116, 124, 134 communicate with the controllers 119, 128, 138 via the HCI interface. Hosts 116, 124, 134 provide HCI commands to the Link Layer of the respective controllers 119, 128, 138 for the purposes of establishing and/or maintaining BTC connections, while the Link Layers manage advertisement, scanning, and connection establishment.

The host 116 of the source device 110 can communicate with the host 124 of the primary accessory device 120 to establish the communication link 102 to form a part of the WPAN network 140. The host 116 of the source device 110 can communicate with the host 134 of the secondary accessory device 130 to establish the communication link 104 to form another part of the WPAN network 140 (alternatively, communication link 104 can be used to snoop (or eavesdrop) on communications between the source device 110 and the primary accessory device 120). The host 124 of the primary accessory device 120 can communicate with the host 134 of the secondary accessory device 130 to establish the communication link 106 to form the WPAN network 150. Upon establishment of the communication link 102 with the primary accessory device 120, the host 116 of the source device 110 can query the host 124 of the primary accessory device 120 for device capabilities, which can include a topology of the primary accessory device 120. The host 124 of the primary accessory device 120 can respond to the query for capabilities from the host 116 of the source device 110 with an indication of scheduling requirements and/or limitations for communication by the primary accessory device 120, e.g., an indication of requirements for internal communication with another device such as for communication with the secondary accessory device 130. The host 116 of the Bluetooth module 118 of the source device 110 can instruct the controller 119 of the Bluetooth module 118 to send a notification to the controller 128 of the primary accessory device 120, the notification indicating availability (and/or unavailability) for transmission (by the source device 110 to the primary accessory device 120) and/or for reception (by the source device 110 from the primary accessory device 120) during a set of time slots of a cycle of time slots for communication between the source device 110 and the primary accessory device 120. In some embodiments, the notification includes a slot availability mask (SAM) that includes an indication for each time slot whether transmission and/or reception is available (or unavailable) for communication between the source device 110 and the primary accessory device 120. The SAM can include at least one set of consecutive time slots per cycle of time slots that are unavailable for transmission and unavailable for reception by the source device 110 for communication to/from the primary accessory device 120. The SAM can also include a guard period of consecutive time slots that immediately precede the at least one set of consecutive time slots, the guard period including time slots that are unavailable for transmission by the source device 110 to the primary accessory device 120. The controller 128 of the Bluetooth module 126 of the primary accessory device 120 can indicate to the controller 119 of the Bluetooth module 118 of the source device 110 whether the controller 128 accepts the restrictions on communication indicated in the notification, e.g., whether the controller 128 accepts the SAM provided by the controller 119 of the source device 110. The controller 128 of the Bluetooth module 126 of the primary accessory device 120 can communicate with the controller 138 of the Bluetooth module 136 of the secondary accessory device 130 to align communication on the wireless communication link 106 in accordance with the notification, e.g., based on the SAM, so that communication on the wireless communication link 106 between the primary accessory device 120 and the secondary accessory device 130 occurs during the set of consecutive time slots for which communication to and from the source device 110 is blocked. In this manner, communication of streaming media packets can occur on time slots for which transmission by the source device 110 is not blocked during a cycle of time slots, and communication of signaling messages (or other communication) between the primary accessory device 120 and the secondary accessory device 130 can occur in the set of time slots that are blocked, and therefore not be subject to interference from communication by the source device 110 to the primary accessory device 120 and/or to the secondary accessory device 130. In some embodiments, the functions of the host 116 of the Bluetooth module 118 are provided at least in part by the main operating system (OS) 112 executing on the processor 114. In some embodiments, the functions of the host 116 of the Bluetooth module 118 are provided at least in part by firmware executing wireless circuitry of the source device 110.

Figure 2:
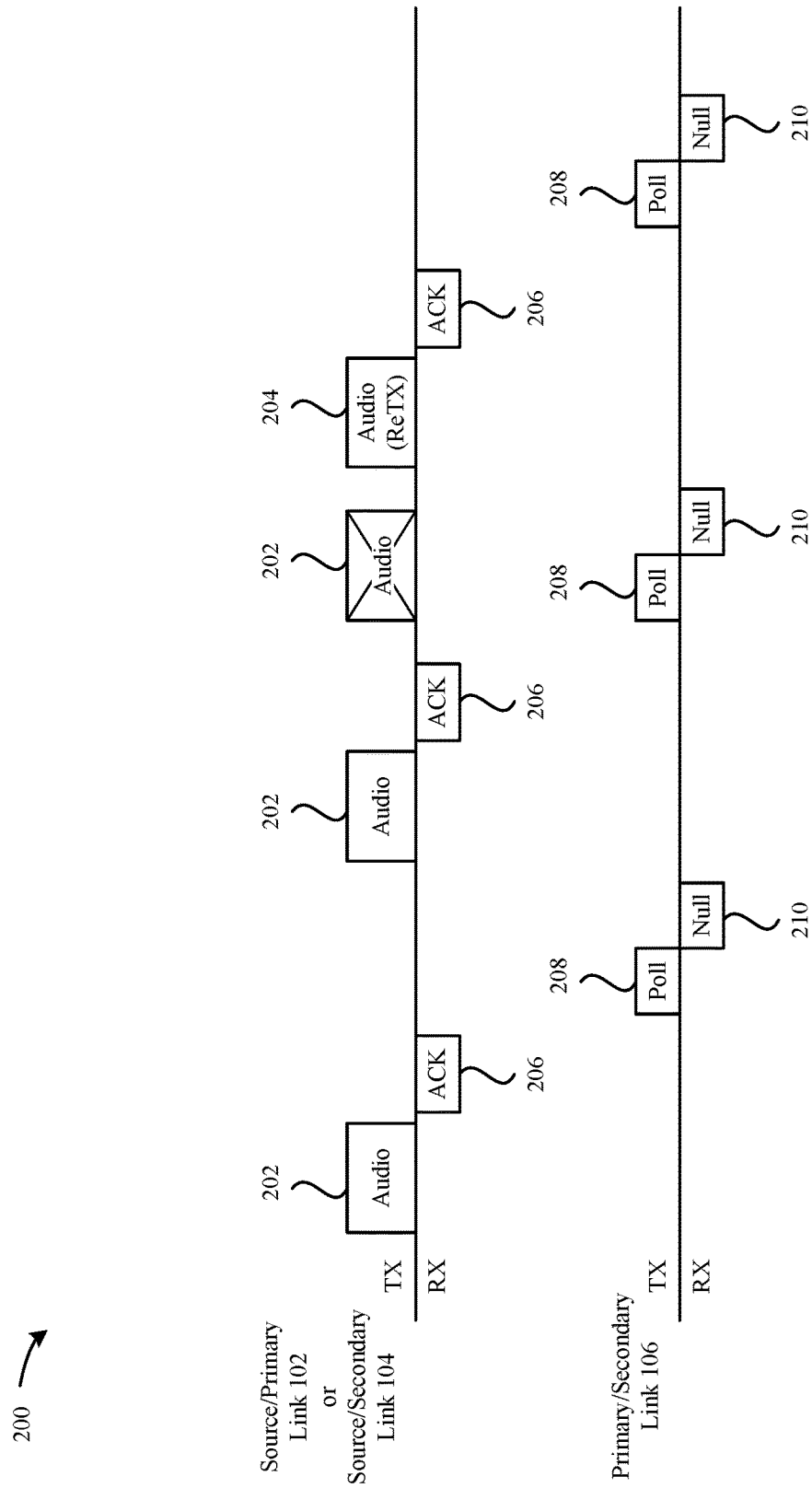
FIG. 2 illustrates a diagram of an example of unscheduled, overlapping communication between electronic devices.

FIG. 2 illustrates a diagram 200 of an example communication scheme in which communication between, e.g., the source device 110 and the primary accessory device 120 via the communication link 102, and/or communication between the source device 110 and the secondary accessory device 130 via the communication link 104, can overlap with communication between the primary accessory device 120 and the secondary accessory device 130 via the communication link 106. In some embodiments, the source device 110 can be a media streaming capable device that provides a media stream, such as an audio stream of audio packets 202, to the primary accessory device 120 and/or to the secondary accessory device 130 via communication links 102 and 104 respectively. The source device 110 can receive from the primary accessory device 120 and/or from the secondary accessory device 130 one or more acknowledgements (ACKs) 206 in response to receipt of audio packets 202 from the source device 110. The primary accessory device 120 can also communicate with the secondary accessory device 130 via the communication link 106. In some embodiments, communication between the primary accessory device 120 and the secondary accessory device 130 can use a polling mechanism, e.g., where the primary accessory device 120 sends a poll 208 to the secondary accessory device 130 and receives from the secondary accessory device 130 a response, which can include a null 210 response. In some embodiments, the communication between the primary accessory device 120 and the secondary accessory device 130 can occur at regular intervals, e.g., based on a regular cycle of time slots. When communication of the media stream, such as of the audio packets 202, from the source device 110 to the primary accessory device 120 and/or to the secondary accessory device 130 is not coordinated with communication between the primary accessory device 120 and the secondary accessory device 130, an overlap of time periods during which both types of communication can occur. When the primary accessory device 120 and the secondary accessory device 130 are communicating with each other, reception of the media stream, such as of an audio packet 202, can be interrupted or otherwise not complete properly, and the primary accessory device 120 and/or the secondary accessory device 130 will not send an expected ACK 206 to the source device 110 for the audio packet 202. For example, the primary accessory device 120 and the secondary accessory device 130 can tune to a different channel (or frequency) than that on which the source device 110 is transmitting. The source device 110 can subsequently send an audio packet retransmission 204. Thus, when the source device 110 is unaware of the timing for internal communication between the primary accessory device 120 and the secondary accessory device 130, transmitted audio packets 202 can inadvertently overlap with communication (or communication periods) between the primary accessory device 120 and the secondary accessory device 130, thereby requiring audio packet retransmission 204, which reduces available bandwidth for communication in the radio frequency band used for the communication links 102 and 104 between the source device 110 and the primary accessory device 120 and the secondary accessory device 130. A high rate of retransmission by the source device 110 can impact the quality of the media stream and/or affect opportunities for the source device 110 to use a shared bandwidth, e.g., a shared ISM band, for other communication, e.g., Wi-Fi communication between the source device 110 and other devices (not shown).

Figure 3:
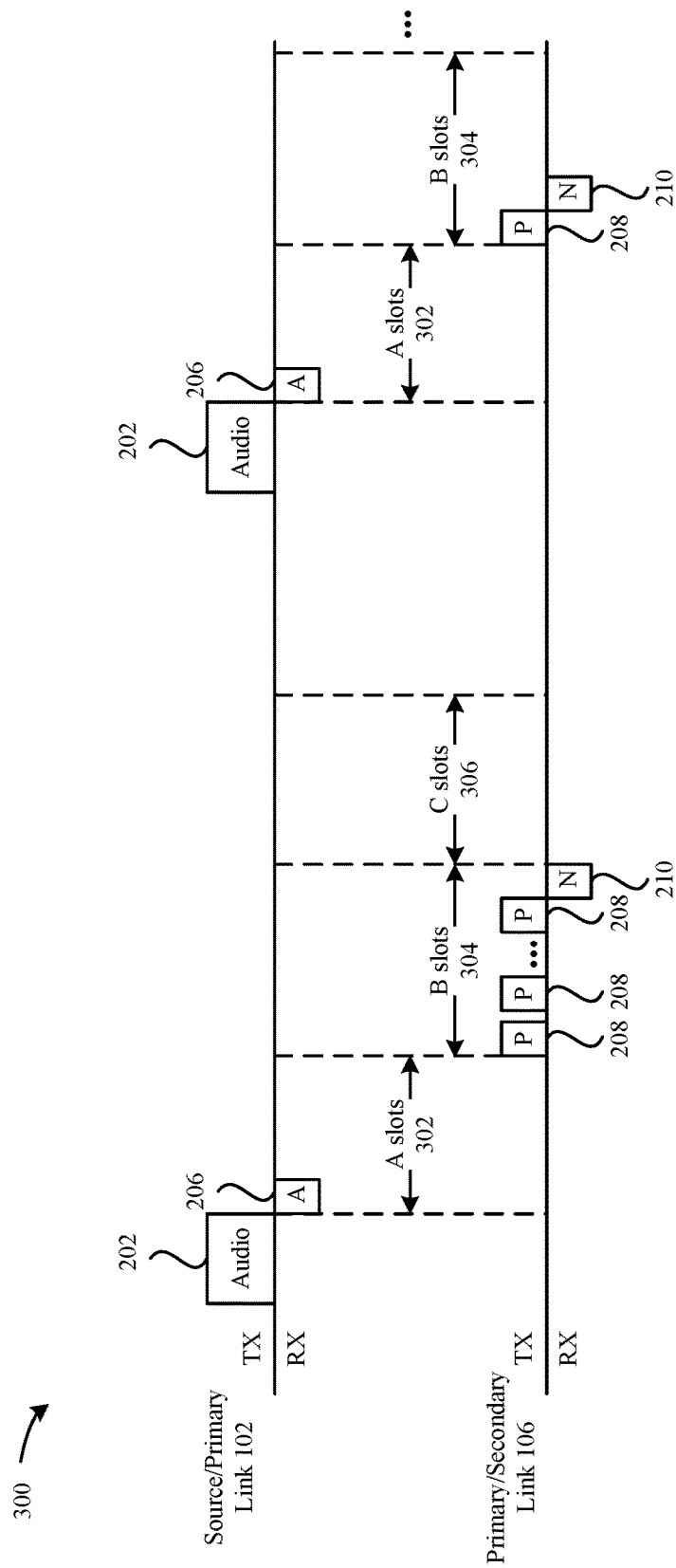
FIG. 3 illustrates a diagram of an exemplary scheme in which communication between electronic devices includes blocked periods to minimize conflicts, in accordance with some embodiments.

FIG. 3 illustrates a diagram 300 of an exemplary communication scheme between electronic devices that includes blocked periods to minimize conflicts. Communication between the source device 110 and the primary accessory device 120 and/or the secondary accessory device 130 via communication links 102 and 104 respectively can include packets for a media streaming application, such as audio packets 202 sent from the source device 110 to the primary accessory device 120 and/or the secondary accessory device 130. To minimize conflict with internal communication between the primary accessory device 120 and the secondary accessory device 130, after receipt of a communication, e.g., an audio packet 202, from the source device 110, the primary accessory device 120 can send an ACK 206 to the primary accessory device 120, to indicate reception of the audio packet 202, and can wait a first time period 302 of "A" consecutive time slots before polling the secondary accessory device 130. The primary accessory device 120 can send one or more polls 208 to the secondary accessory device 130 during a second time period 304 of "B" consecutive time slots. The primary accessory device 120 can further wait and refrain from communication with the secondary accessory device 130 for a third time period 306 of "C" consecutive time slots after the second time period 304. The primary accessory device 120 can include the time period 302 of A slots after receipt of each audio packet 202 before allowing for communication with the secondary accessory device 130.

Figure 4:
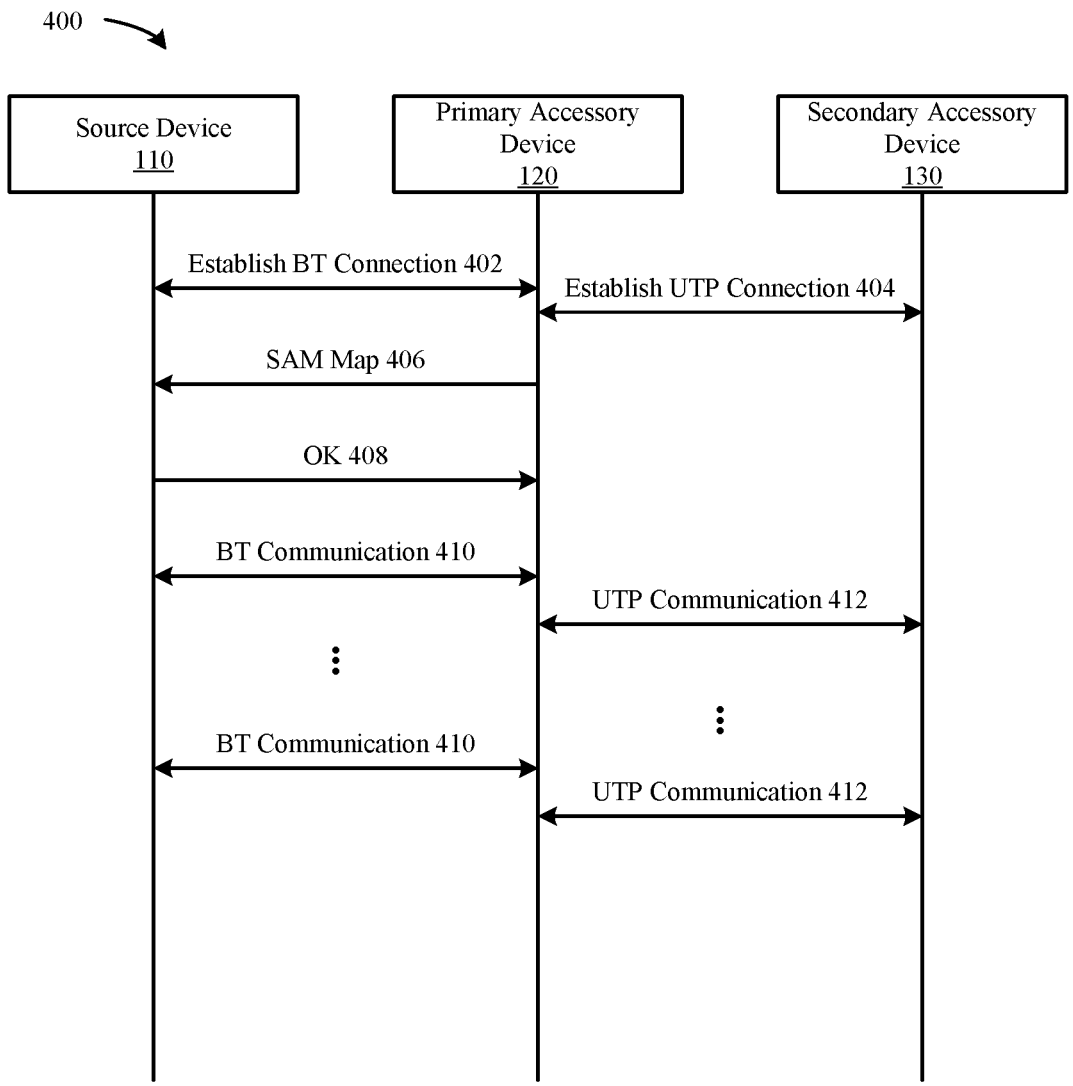
FIG. 4 illustrates a diagram of an exemplary communication scheme between electronic devices that schedules communications, in accordance with some embodiments.

FIG. 4 illustrates a diagram 400 of an exemplary communication scheme between electronic devices that can schedule communication, e.g., by the source device 110 to the primary accessory device 120 based on communication of a slot availability mask (SAM) from the primary accessory device 120 to the source device 110. At 402, the source device 110 establishes a WPAN connection, e.g., a Bluetooth connection, with the primary accessory device 120. At 404, the primary accessory device 120 establishes a separate WPAN connection, e.g., a Bluetooth connection or a UTP connection, to the secondary accessory device 130. The WPAN connection between the primary accessory device 120 and the secondary accessory device 130 can occur before or after the Bluetooth connection is established between the source device 110 and the primary accessory device 120. At 406, the primary accessory device 120 provides to the source device 110 an indication of time periods when communication should be restricted to the primary accessory device 120, e.g., by sending the SAM map to the source device 110. In some embodiments, the primary accessory device 120 provides the SAM map to the source device 110 in response to a query from the source device 110. In some embodiments, the source device 110 queries the primary accessory device 120 about its capabilities, e.g., as part of establishing the BT connection, and subsequently queries the primary accessory device 120 for restrictions on communication, such as to obtain requirements for restrictions on communication with another device. In some embodiments, the source device 110 queries the primary accessory device 120 about communication restrictions based at least in part on learning that the primary accessory device 120 and the source device 110 share a common original equipment manufacturer (OEM), which can be indicated by an OEM identifier during the establishment of the BT connection or thereafter. At 408, the source device 110 provides an acceptance response of the SAM map received from the primary accessory device 120. At 410, the source device 110 schedules communication between the source device 110 and the primary accessory device 120 to occur in accordance with the SAM map received from the primary accessory device 120. At 412, the primary accessory device schedules communication between the primary accessory device 120 and the secondary accessory device 130 to occur in accordance with the SAM map provided to the source device 110. The communication between the source device 110 and the primary accessory device 120 can occur during time periods that do not overlap with time periods for communication between the primary accessory device 120 and the secondary accessory device 130.

Figure 5:
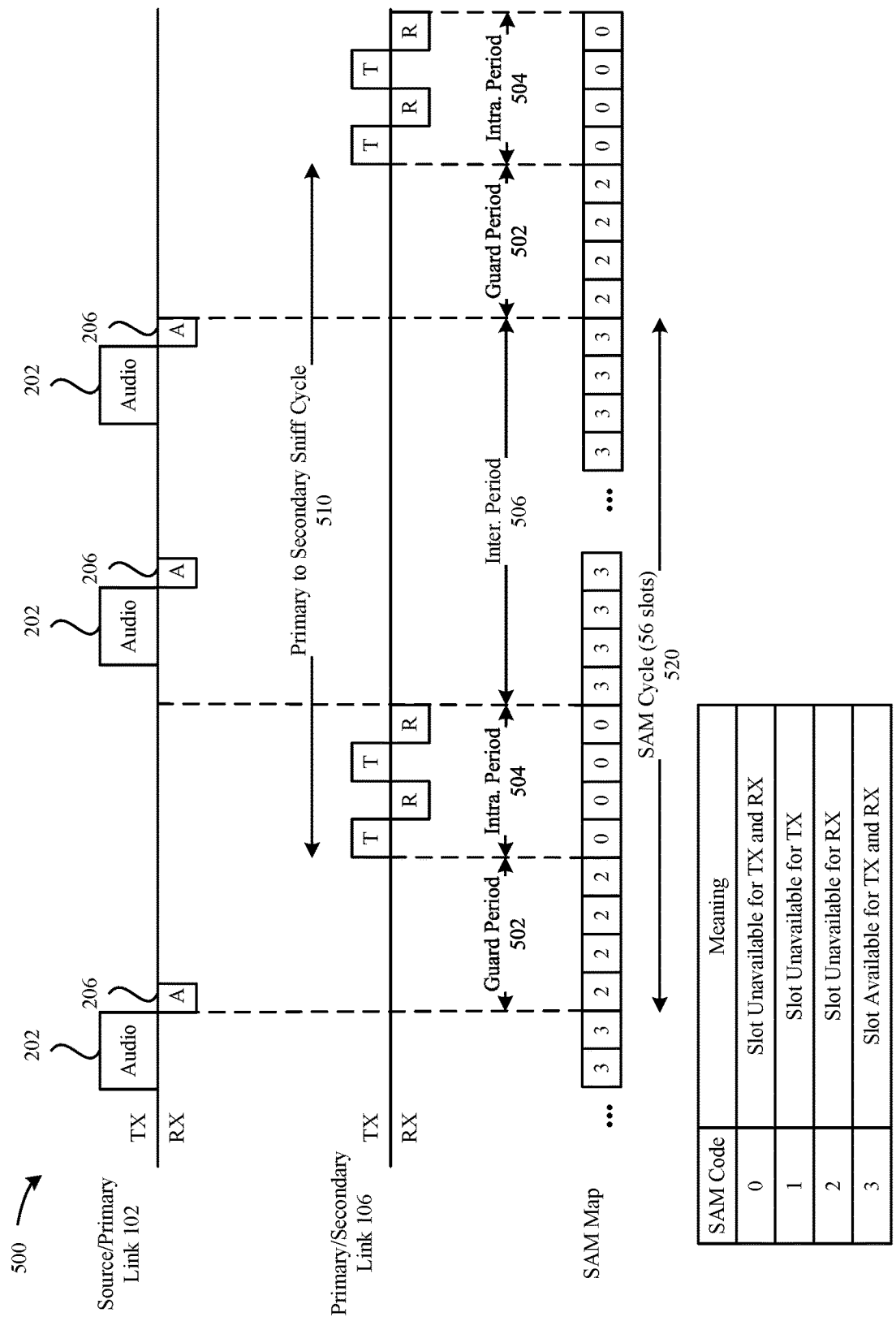
FIG. 5 illustrates a diagram of an exemplary communication scheme that schedules communication between electronic devices based on a slot availability mask, in accordance with some embodiments.
Figure 6:
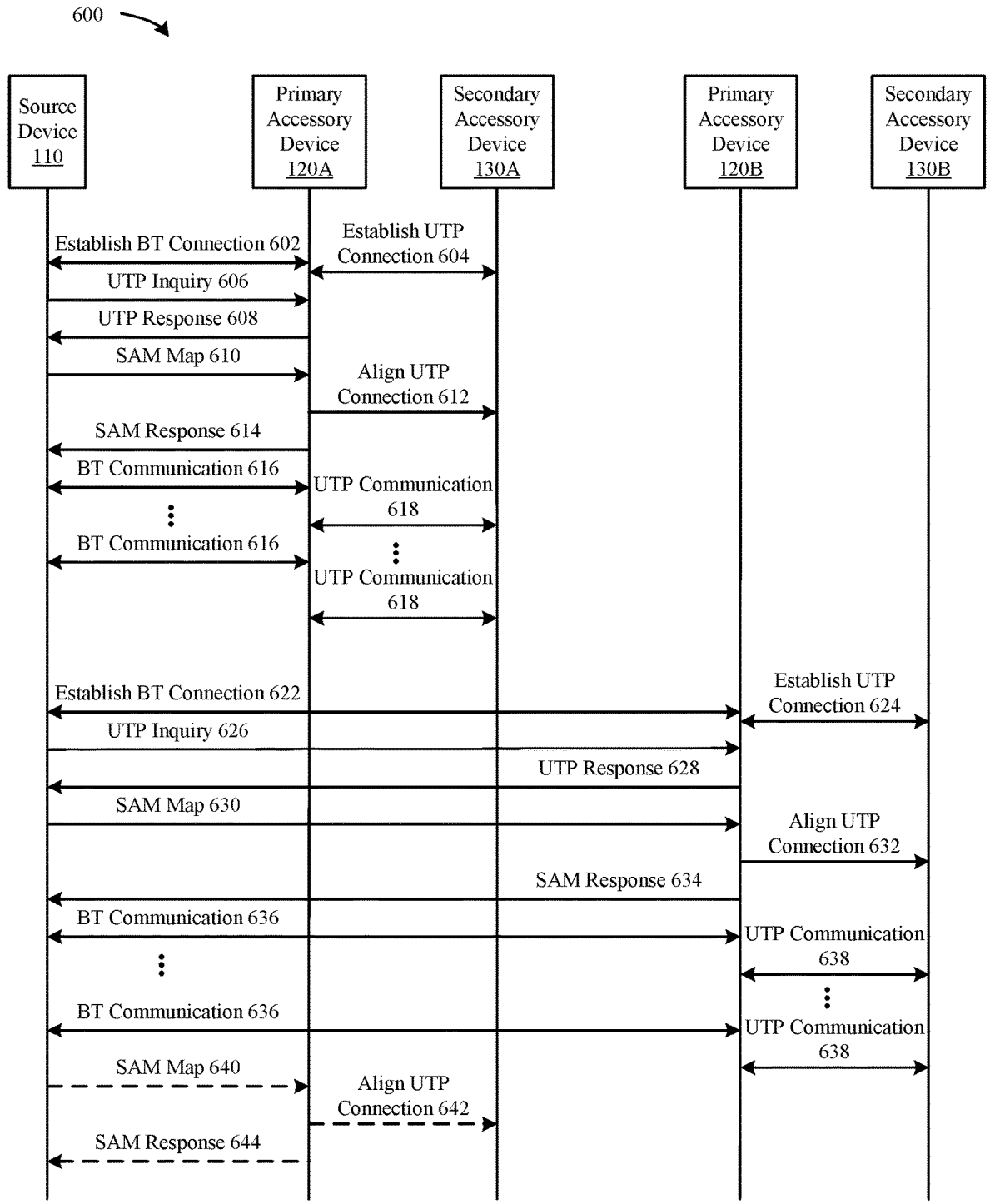
FIG. 6 illustrates a diagram of another exemplary communication scheme between electronic devices that schedules communications, in accordance with some embodiments.

FIG. 5 illustrates a diagram 500 of an exemplary communication scheme between electronic devices that schedules communication, e.g., by the source device 110 with the primary accessory device 120 and/or with the secondary accessory device 130 as well as communication between the primary accessory device 120 and the secondary accessory device 130 in accordance with a SAM map. Communication between the source device 110 and the primary accessory device 120 and/or the secondary accessory device 130, as well as communication between the primary accessory device 120 and the secondary accessory device 130, is divided into a SAM cycle 520 of time slots according to the SAM map, e.g., a cycle of 56 slots. In some embodiments, the SAM map is provided to the source device 110 by the primary accessory device 120 as illustrated in FIG. 4. In some embodiments, the SAM map is provided by the source device 110 to the primary accessory device 120 as illustrated in FIG. 6 and discussed further herein. The SAM map can specify for time slots in the SAM cycle 520 of time slots whether the time slot is available for transmission and/or reception. The SAM map can specify transmission and/or reception availability from the perspective of the device that provides the SAM map, e.g., from the perspective of the primary accessory device 120 when the SAM map is sent to the source device 110 by the primary accessory device 120, and from the perspective of the source device 110 when the SAM map is sent from the source device 110 to the primary accessory device 120.

For example, the SAM map illustrated in FIG. 5 includes a guard period 502 of four time slots that are marked as unavailable for reception by the primary accessory device 120. In some embodiments, the SAM map also applies to the secondary accessory device 130, and the source device 110 refrains from transmission to the primary accessory device 120 and/or to the secondary accessory device 130 during the guard period. The guard period 502 includes a set of consecutive time slots that immediately precede an intra-communication time period 504 that is used for communication between the primary accessory device 120 and the secondary accessory device 130. The intra-communication time period 504 is marked as unavailable for transmission from the primary accessory device 120 to the source device 110 and also unavailable for reception of communication from the source device 110 to the primary accessory device 120. During the intra-communication time period 504, the primary accessory device 120 communicates with the secondary accessory device 130, e.g., by polling the secondary accessory device 130 and receiving responses to the polling. The primary accessory device 120 and the secondary accessory device 130 can communicate at a regular repeated cycle, which can be referred to as a sniff cycle 510, which is illustrated as extending from the start of an intra-communication time period 504 to the start of an immediately following intra-communication time period 504. In some embodiments, the time duration of the SAM cycle 520 can correspond to the time duration of the sniff cycle 510. The SAM cycle 520 further includes an inter-communication time period 506 of time slots marked as available for communication between the primary accessory device 120 and the source device 110. The source device 110 can send communication, e.g., media streaming packets, such as audio packets, to the primary accessory device 120 via the communication link 102 (as shown in FIG. 5) and/or to the secondary accessory device 130 via the communication link 104 (not shown in FIG. 5). The length of the guard period 502 can be set to ensure that multi-slot packets or retransmissions of packets from the source device 110 to the primary accessory device 120 complete before the intra-communication time period 504. In some embodiments, the use of a SAM map is conditioned on the source device 110 determining compatibility with the primary accessory device 120, e.g., during establishment of the communication link 102. In some embodiments, the use of the SAM map depends on the source device 110 and the primary accessory device 120 sharing a common Original Equipment Manufacturer (OEM), which can be communicated by an OEM identifier (ID) during (and/or after) establishment of the communication link 102. The SAM cycle 520 can span a different number of time slots (e.g., other than 56) in some embodiments. Similarly, the number of time slots allotted to the guard period 502, the intra-communication time period 504, and the inter-communication time period 506 can be set to any number of time slots.

FIG. 6 illustrates a diagram 600 of an exemplary communication scheme between electronic devices that can schedule communication, e.g., between the source device 110 and a primary accessory device 120A, based on communication of a SAM map provided to the primary accessory device 120A, by the source device 110, and also provided to another primary accessory device 120B, by the source device 110. At 602, the source device 110 establishes a WPAN connection, e.g., a Bluetooth connection, with the primary accessory device 120A. At 604, the primary accessory device 120A establishes a separate WPAN connection, e.g., a UTP connection, to a secondary accessory device 130A. The establishment of the separate WPAN connection between the primary accessory device 120A and the secondary accessory device 130A can occur before or after the establishment of the WPAN connection between the source device 110 and the primary accessory device 120A. At 606, the source device 110 queries the primary accessory device 120A to ascertain requirements from the primary accessory device 120A, e.g., to learn about scheduling requests and/or limitations that the primary accessory device 120A requires for communication with another device, e.g., with the secondary accessory device 130A. In some embodiments, the query by the source device 110 sent to the primary accessory device 120A is to obtain information about limitations for communication via a WPAN connection (or UTP connection) between the primary accessory device 120A and another device, such as via the WPAN/UTP connection established at 604. At 608, the primary accessory device 120A responds to the query from the source device 110 by providing information to the source device 110 that indicates requirements for communication limitations. In some embodiments, the response to the query includes a SAM map. In some embodiments, the response to the query includes an indication of how often and for what time duration (e.g., in time slots) the primary accessory device 120A requires for a period of internal communication with another device (other than with the source device 110). In some embodiments, the response to the query includes an indication of a number of consecutive time slots to be set aside for internal communication with another device during a cycle of time slots. At 610, the source device 110 responds to the primary accessory device 120A with a SAM map that defines a cycle of time slots (e.g., that can be repeated). The SAM map indicates for time slots in the cycle whether the time slot is available (or unavailable) for transmission (from the source device 110 to the primary accessory device 120A) and whether the time slot is available (or unavailable) for reception (of communication from the primary accessory device 120A to the source device 110). The SAM map provided at 610 can be based at least in part on the response provided by the primary accessory device 120A to the query for requirements from the source device 110. At 612, the primary accessory device 120A can align internal communication with the secondary accessory device 130A based on the SAM map received at 610, e.g., by sending a command to the secondary accessory device 130A that indicates when internal communication such as a polling cycle will occur. At 614, the primary accessory device 120A responds to the source device 110 with an indication of an acceptance (or a rejection) of the SAM map. After the exchange of query, response, SAM map, and SAM response, the source device 110, the primary accessory device 120A, and the secondary accessory device 130A can communicate in accordance with the SAM map. For example at 616, the source device 110 can communicate with the primary accessory device 120A (which can include communication of streaming media packets, such as audio packets 202). In some embodiments, communication at 616 can also include the source device 110 communicating with the secondary accessory device 130A (such as sending streaming media packets). At 618, the primary accessory device 120A communicates with the secondary accessory device 130A.

The communication scheme illustrated in FIG. 6 from 602 to 618 provides for aligning communication of a source device 110 with a pair of devices, such as with the primary accessory device 120A that is paired with the secondary accessory device 130A. In some embodiments, the source device 110 can be configured to pair with one or more additional pairs of accessory devices, such as with primary accessory device 120B paired with secondary accessory device 130B. Internal communication between accessory devices within different pairs of accessory devices may not, a priori, be aligned to use a common time period (or an overlapping set of time periods). As the internal communication between the primary accessory device 120B and the secondary accessory device 130B may not align with the internal communication between the primary accessory device 120A and the secondary accessory device 130A, the source device 110 can query the primary accessory device 120B in a similar manner as done for the primary accessory device 120A and subsequently align communication so that both pairs of accessory devices use the same time period for internal communication between themselves. At 622, the source device establishes a WPAN connection, e.g., a Bluetooth connection, with the primary accessory device 120B. At 624, the primary accessory device 120B establishes a separate WPAN connection, e.g., a UTP connection, with the secondary accessory device 130B. Establishment of the UTP connection between the primary accessory device 120B and the secondary accessory device 130B can occur before or after establishment of the WPAN connection between the source device 110 and the primary accessory device 120B. At 626, the source device 110 queries the primary accessory device 120B to ascertain requirements from the primary accessory device 120B, e.g., to learn about scheduling requests and/or limitations that the primary accessory device 120B requires for communication with another device, e.g., with the secondary accessory device 130B. In some embodiments, the query by the source device 110 sent to the primary accessory device 120B is to obtain information about limitations for communication via a connection between the primary accessory device 120B and another device, such as via the connection established at 624. At 628, the primary accessory device 120B responds to the query from the source device 110 by providing information to the source device 110 that indicates requirements for communication limitations. In some embodiments, the response to the query includes a SAM map. In some embodiments, the response to the query includes an indication of how often and for what time duration the primary accessory device 120B requires for a period of internal communication with another device (other than with the source device 110). In some embodiments, the response to the query includes an indication of a number of consecutive time slots to be set aside for internal communication with another device during a cycle of time slots (e.g., which can be repeated). At 630, the source device 110 responds to the primary accessory device 120B with a SAM map that defines a repeated cycle of time slots, and for each time slot in the repeated cycle whether the time slot is available (or unavailable) for transmission (from the source device 110 to the primary accessory device 120B) and whether the time slot is available (or unavailable) for reception (of communication from the primary accessory device 120B to the source device 110). The SAM map provided at 630 can be based at least in part on the response provided by the primary accessory device 120B to the query for requirements from the source device 110. At 632, the primary accessory device 120B can align internal communication with the secondary accessory device 130B based on the SAM map received at 630, e.g., by sending a command to the secondary accessory device 130B that indicates when internal communication such as a polling cycle will occur. At 634, the primary accessory device 120B responds to the source device 110 with an indication of an acceptance (or a rejection) of the SAM map. After the exchange of query, response, SAM map, and SAM response, the source device 110, the primary accessory device 120B, and the secondary accessory device 130B can communicate in accordance with the SAM map provided at 630. For example at 636, the source device 110 can communicate with the primary accessory device 120B (which can include communication of streaming media packets, such as audio packets 202). In some embodiments, communication at 636 can also include the source device 110 communicating with the secondary accessory device 130B (such as sending streaming media packets). At 638, the primary accessory device 120B communicates with the secondary accessory device 130B. In some embodiments, the SAM map provided to the primary accessory device 120B at 630 aligns with the SAM map previously provided to the primary accessory device 120A at 610. In some embodiments, the requirements for internal communication between the primary accessory device 120B and the secondary accessory device 130B align with similar (or identical) requirements for internal communication between the primary accessory device 120A and the secondary accessory device 130A.

In some embodiments, communication between the source device 110 and the primary accessory device 120A is realigned after adding communication between the source device 110 and the primary accessory device 120B. For example, at 640, the source device 110 can provide an updated SAM map, which can be aligned with the SAM map provided to the primary accessory device 120B at 630. At 642, the primary accessory device 120A aligns internal communication with the secondary accessory device 130A in accordance with the updated SAM map received at 640. At 644, the primary accessory device 120A indicates acceptance (or rejection) of the updated SAM map received from the source device 110. In some embodiments, the original SAM map is used both for communication between the source device 110 and the primary accessory device 120A and for communication between the source device 110 and the secondary accessory device 130A as well as for internal communication within the pairs of accessory devices. In some embodiments, the updated SAM map is used both for communication between the source device 110 and the primary accessory device 120A and for communication between the source device 110 and the secondary accessory device 130A, as well as for internal communication within the pairs of accessory devices. In such cases, internal communication between accessory devices in multiple pairs of accessory devices connected to the source device 110 can be aligned to occur during the same time period of time slots for a cycle of time slots, e.g., in accordance with a SAM map. In some embodiments, communication from the source device 110 to the primary accessory devices 120A/B is also aligned to occur during the same time slots for one or more cycles, in accordance with the SAM map. In some embodiments, communication from the source device 110 to the accessory devices 130A/B is also aligned to occur during the same time slots for a cycle of time slots, in accordance with the SAM map. By coordinating the period of communication between the primary accessory devices 120 and secondary accessory devices 130 (the intra-communication time period 504) across multiple pairs of accessory devices, the source device 110 can simplify communications.

Figure 7:
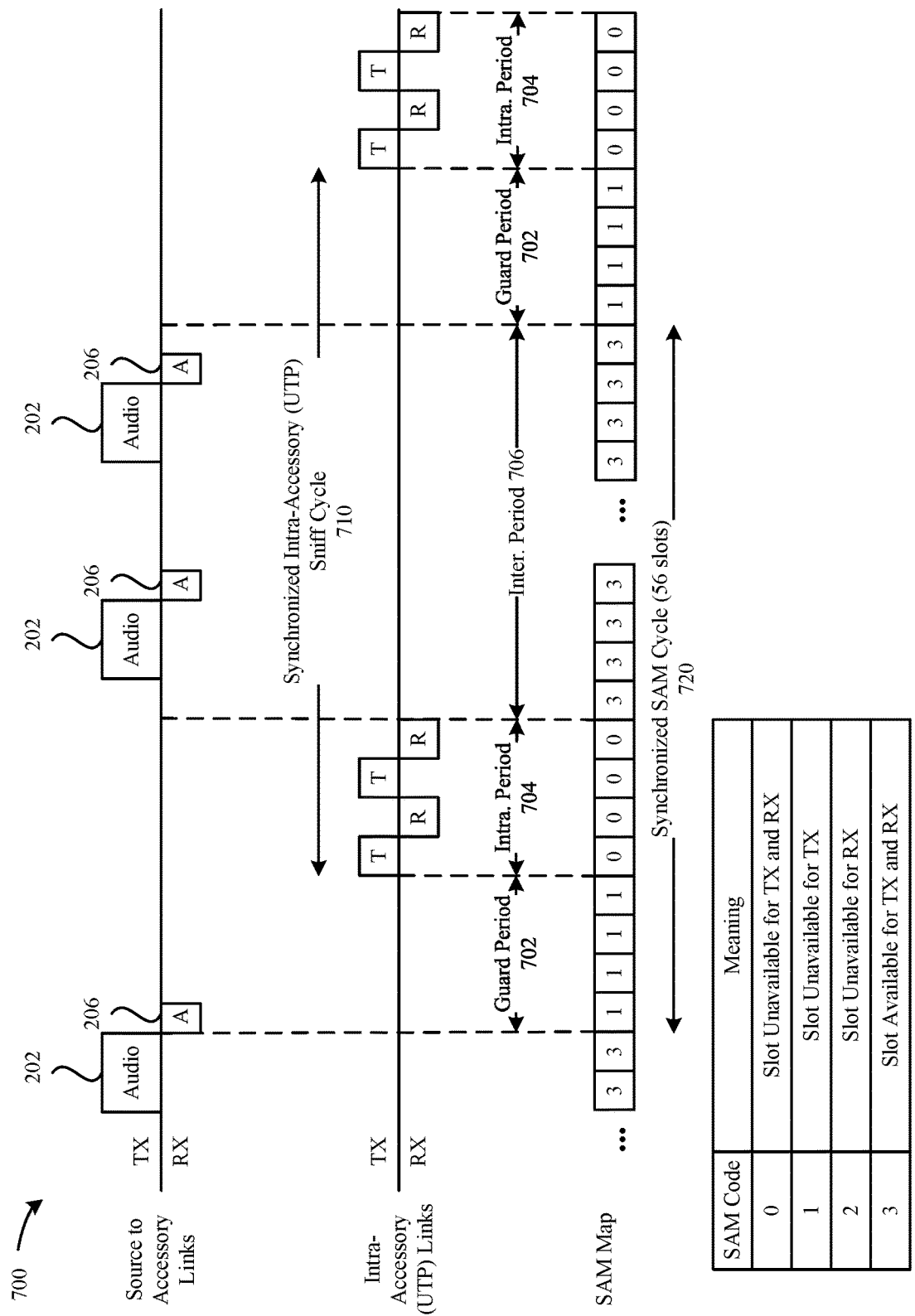
FIG. 7 illustrates a diagram of another exemplary communication scheme that schedules communication between electronic devices based on a slot availability mask, in accordance with some embodiments.

FIG. 7 illustrates a diagram 700 of a communication scheme between electronic devices that schedules communication between the source device 110 and one or more accessory devices, e.g., with one or more of: the primary accessory device 120A, the primary accessory device 120B, the secondary accessory device 130A, and the secondary accessory device 130B as well as communication between accessory devices, e.g., communication between the primary accessory device 120A and the secondary accessory device 130A and/or communication between the primary accessory device 120B and the secondary accessory device 130B in accordance with a SAM map. Communication between the source device 110 and accessory devices, as well as communication between accessory devices, is divided into a SAM cycle 720 of time slots according to the SAM map. In some embodiments, the SAM cycle 720 can include 56 time slots, both other numbers of time slots can be used in other embodiments.

In some embodiments, the SAM map is provided by the source device 110 to primary accessory devices, e.g., to the primary accessory device 120A and/or to the primary accessory device 120B, as illustrated in FIG. 6. The SAM map can specify for time slots in the SAM cycle 720 whether a time slot is available for transmission and/or reception. The SAM map can specify transmission and reception availability from the perspective of the device that provides the SAM map, e.g., from the perspective of the source device 110 when the SAM map is sent from the source device 110 to the primary accessory device(s) 120A/B. For example, the SAM map illustrated in FIG. 7 includes a guard period 702 of four time slots that are marked as unavailable for transmission by the source device 110 to the accessory devices, e.g., to the primary accessory devices 120A/B and/or to the secondary accessory devices 130A/B. The source device 110 refrains from transmission during the guard period 702. The guard period 702 includes a set of consecutive time slots that immediately precede an intra-communication time period 704 that is used for communication between the primary accessory devices 120A/B and the secondary accessory devices 130A/B. The intra-communication time period 704 is marked as unavailable for transmission to the primary accessory devices 120A/B from the source device 110 and also unavailable for reception of communication sent to the source device 110 from the primary accessory devices 120A/B. During the intra-communication time period 704, the primary accessory devices 120A/B communicate with the secondary accessory devices 130A/B, e.g., by polling the secondary accessory devices 130A/B and receiving responses to the polling. The intra-communication time period 704 can apply to all pairs (or to a subset of pairs) of accessory devices that are in communication with the source device 110. The intra-communication time period 704 can be aligned for pairs of accessory devices that receive a common media stream during the inter-communication time period 706. The primary accessory devices 120A/B and the secondary accessory devices 130A/B can communicate at a regular repeated cycle, which can be referred to as a synchronized intra-accessory sniff cycle 710, and the length of the SAM cycle 720 can be set to correspond to the length of the synchronized intra-accessory sniff cycle 710 of intra-communication time periods 704 for communication between the primary accessory devices 120A/B and the secondary accessory devices 130A/B. The SAM cycle 720 further includes the inter-communication time period 706 of time slots marked as available for communication between the primary accessory devices 120A/B and the source device 110. As illustrated in FIG. 7, the source device 110 sends communication, e.g., media streaming packets, such as audio packets, to the primary accessory devices 120A/B and to the secondary accessory devices 130A/B. The length of the guard period 702 can be set to ensure that multi-slot packets or retransmissions of packets from the source device 110 to the primary accessory devices 120A/B complete before the intra-communication time period 704. In some embodiments, the use of a SAM map is conditioned on the source device 110 determining compatibility with the primary accessory devices 120A/B, e.g., during establishment communication links with the primary accessory devices 120A/B. In some embodiments, the use of the SAM map depends on the source device 110 and the primary accessory devices 120A/B sharing a common Original Equipment Manufacturer (OEM), which can be communicated by an OEM identifier (ID) during (and/or after) establishment of communication links between them.

Figure 8A:
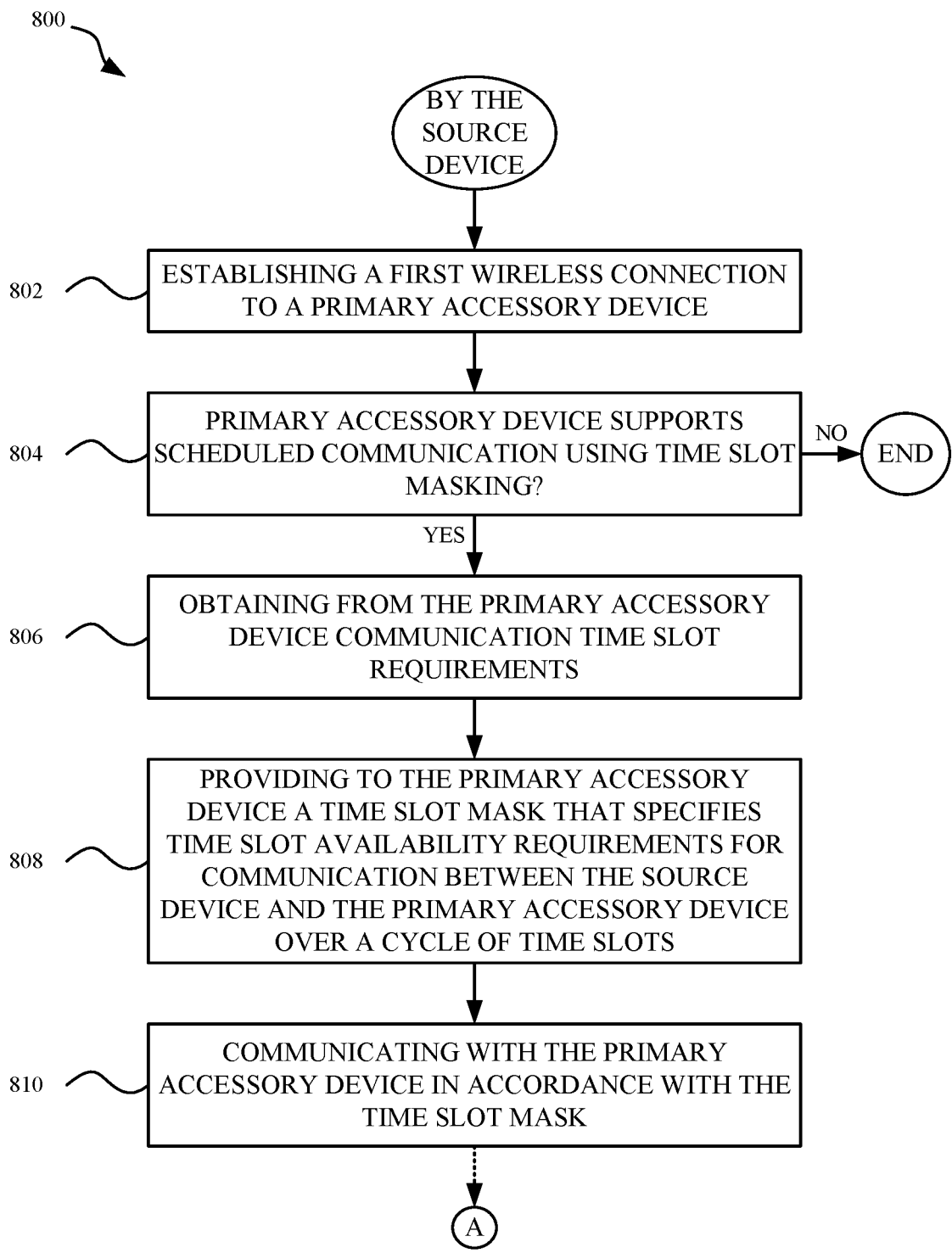
FIGS. 8A and 8B illustrate flow diagrams of exemplary methods performed by a source device for scheduling communication for one or more accessory devices paired with the source device, in accordance with some embodiments.

FIG. 8A illustrates a flow diagram 800 of an exemplary method for scheduling communication for one or more accessory devices paired with a source device 110. At 802, the source device establishes a first wireless connection, e.g., a wireless personal area network (WPAN) connection, with a primary accessory device 120. The primary accessory device 120 can be configurable to pair with a secondary accessory device 130, such as via a second wireless connection, e.g., another WPAN connection. At 804, the source device 110 determines whether the primary accessory device 120 supports scheduled communication using time slot masking, such as based on a slot availability mask (SAM) map. When the source device 110 determines that the primary accessory device 120 supports scheduled communication using time slot masking, the source device obtains, at 806, from the primary accessory device 120 communication time slot requirements. At 808, the source device 110 provides to the primary accessory device 120 a time slot mask that specifies time slot availability requirements for communication between the source device 110 and the primary accessory device 120 over a cycle of time slots. At 810, the source device 110 communicates with the primary accessory device 120 via the first WPAN connection in accordance with the time slot mask provided. In some embodiments, the primary accessory device 120 communicates with the secondary accessory device 130 via the second WPAN connection in accordance with the time slot mask.

In some embodiments, the time slot availability requirements for communication obtained from the primary accessory device 120 by the source device 110 specify a periodic communication cycle that includes a minimum continuous time period required for dedicated communication between the primary accessory device 120 and the secondary accessory device 130. In some embodiments, the time slot mask includes a set of at least two consecutive time slots indicated as unavailable for both transmission and reception by the source device 110 per cycle of time slots, and the primary accessory device 120 communicates with the secondary accessory device 130 during the set of at least two consecutive time slots. In some embodiments, a length of the set of at least two consecutive time slots and a length of the cycle of time slots is based at least in part on minimum requirements for communication between the primary accessory device 120 and the secondary accessory device 130. In some embodiments, a guard period including a second set of at least two consecutive time slots indicated as unavailable for transmission by the source device 110 immediately precedes the set of at least two consecutive time slots indicated as unavailable for both transmission and reception by the source device 110. In some embodiments, the source device 110 determines whether the primary accessory device 120 supports scheduled communication using time slot masking by at least determining whether the primary accessory device 120 supports slot availability masks in accordance with a Bluetooth communication protocol. In some embodiments, the source device 110 determines whether the primary accessory device 120 supports scheduled communication using time slot masking comprises determining whether the primary accessory device 120 and the source device 110 share a common original equipment manufacturer (OEM) identifier (ID). In some embodiments, the cycle of time slots includes a third set of consecutive time slots indicated as available for both transmission and reception by the source device 110, and a length of the third set of consecutive time slots is sufficient to communicate at least one audio packet from the source device 110 to the primary accessory device 120 in accordance with an Advanced Audio Distribution Profile (A2DP) of a Bluetooth communication protocol.

Figure 8B:
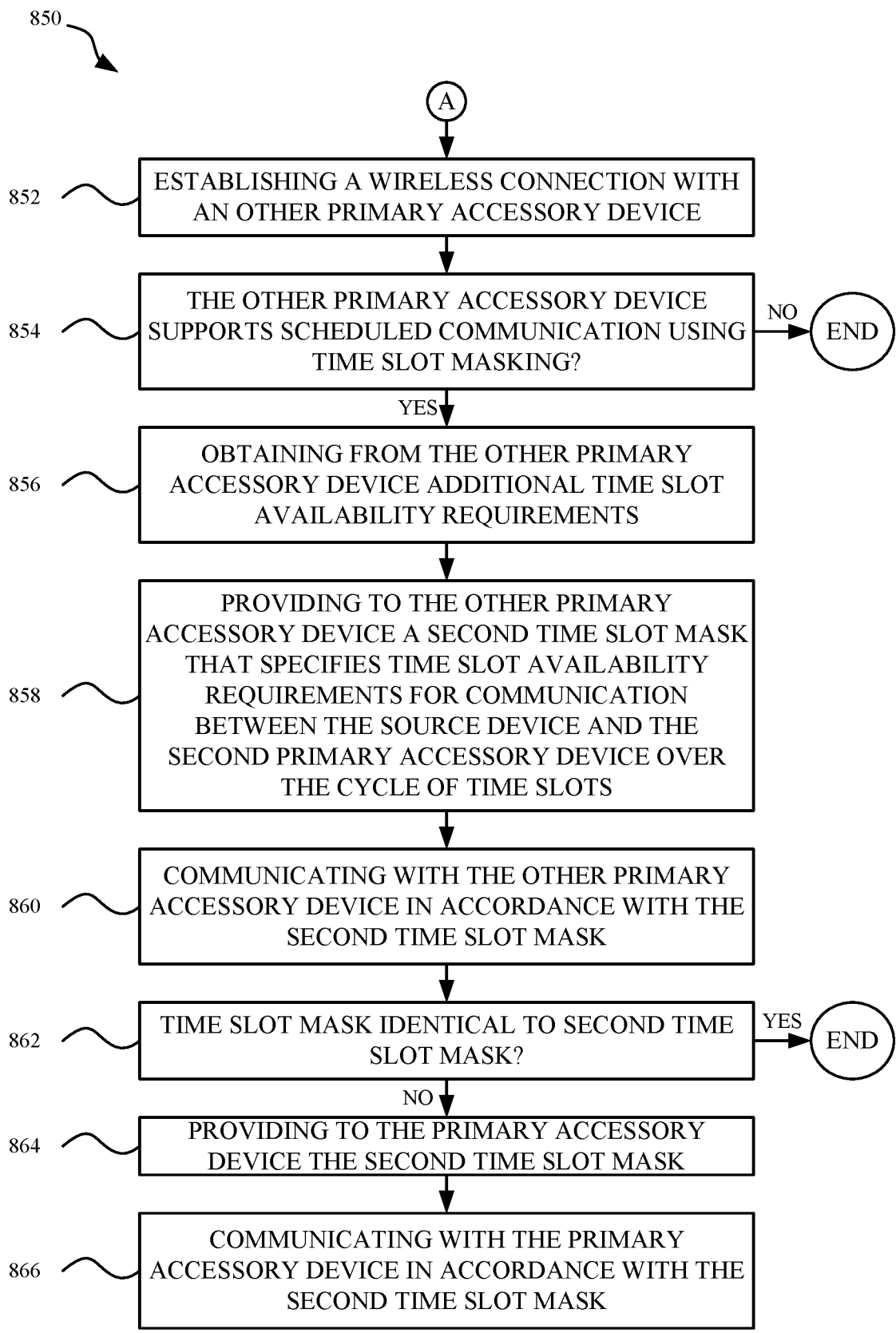

FIG. 8B illustrates a flow diagram 850 of additional actions for the exemplary method of FIG. 8A for scheduling communication for one or more accessory devices paired with the source device 110. At 852, the source device 110 establishes a third wireless connection with primary accessory device 120B (where the primary accessory device 120 of FIG. 8A can correspond to primary accessory device 120A). At 854, the source device 110 determines whether primary accessory device 120B supports scheduled communication using time slot masking. When primary accessory device 120B supports scheduled communication using time slot masking, the source device 110 obtains, at 856, from primary accessory device 120B time slot availability requirements for communication. At 858, the source device 110 provides to primary accessory device 120B a second time slot mask that specifies time slot availability requirements for communication between the source device 110 and primary accessory device 120B over the cycle of time slots. At 860, the source device 110 communicates with primary accessory device 120A in accordance with the second time slot mask. In some embodiments, the time slot mask provided to primary accessory device 120 (or to primary accessory device 120A) is identical to the second time slot mask. At 862, the source device determines whether the time slot mask and the second time slot mask are identical. At 864, when the time slot mask and the second time slot mask are not identical, the source device 110 provides to primary accessory device 120 (or to primary accessory device 120A) the second time slot mask. At 866, the source device communicates with primary accessory device 120 (or with primary accessory device 120A) in accordance with the second time slot mask. In some embodiments, primary accessory device 120 (or primary accessory device 120A) realigns communication with secondary accessory device 130 (or with secondary accessory device 130A) based at least in part on the second time slot mask. In some embodiments, internal communication between accessory devices of one or more pairs of accessory devices that are in communication with the source device 110 are aligned to use the same set of time slots (or at least an overlapping set of time slots) during a repeated cycle of time slots in accordance with time slot masks provided to the accessory devices by the source device 110.

Figure 9:
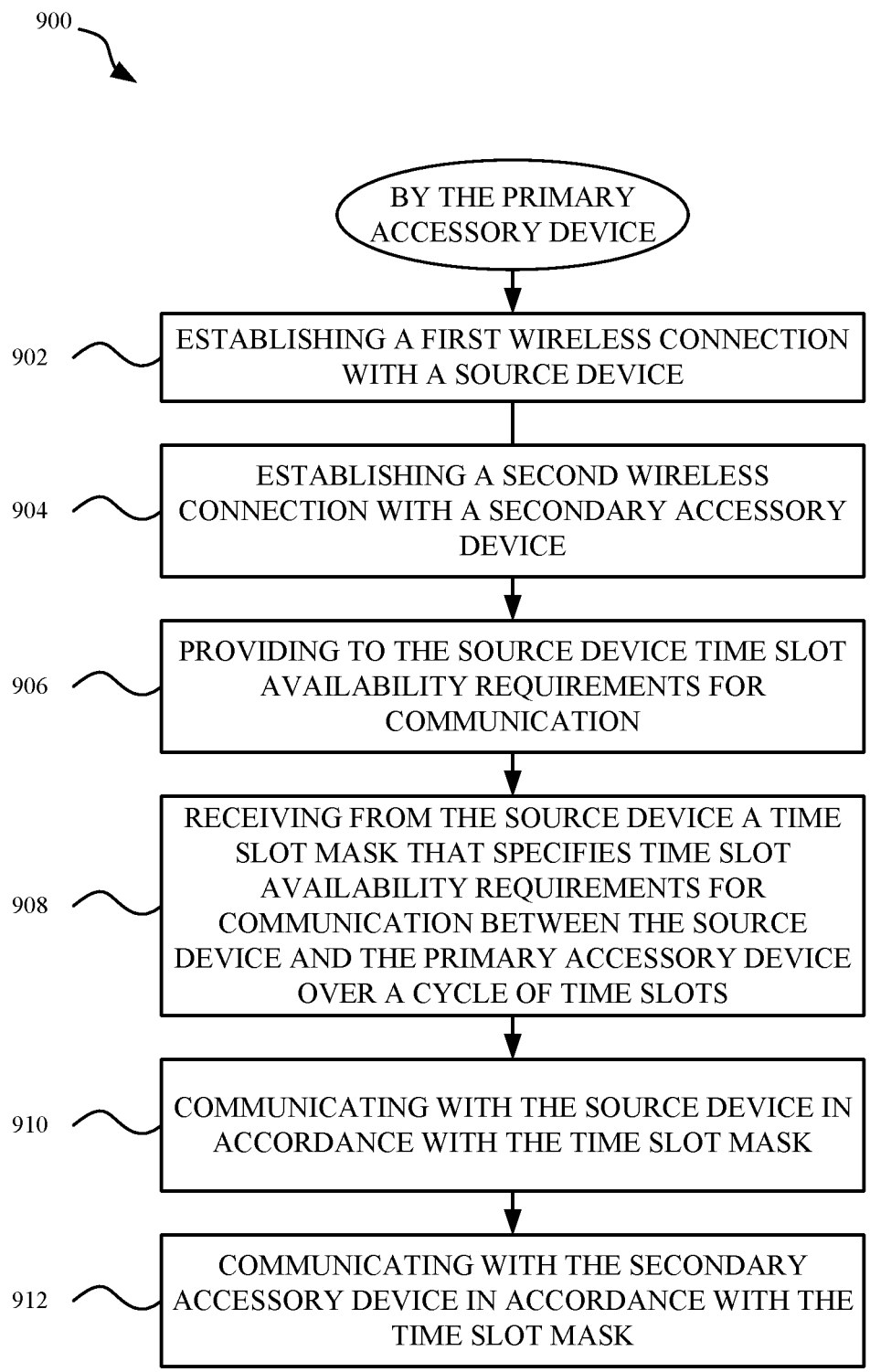
FIG. 9 illustrates a flow diagram of an exemplary method performed by a primary accessory device for scheduling communication for accessory devices paired with a source device, in accordance with some embodiments.

FIG. 9 illustrates a flow diagram 900 of an exemplary method performed by primary accessory device 120 for scheduling communication for accessory devices paired with source device 110. At 902, primary accessory device 120 establishes a first wireless connection, e.g., a first WPAN connection, with source device 110. At 904, primary accessory device 120 establishes a second wireless connection, e.g., a second WPAN connection, with secondary accessory device 130. At 906, primary accessory device 120 provides to source device 110 time slot availability requirements for communication. At 908, primary accessory device 120 receives from source device 110 a time slot mask that specifies time slot availability requirements for communication between source device 110 and primary accessory device 120 over a cycle of time slots. At 910, primary accessory device 120 communicates with source device 110 in accordance with the time slot mask. At 912, primary accessory device 120 communicates with secondary accessory device 130 in accordance with the time slot mask.

In some embodiments, the requirements for time slot availability for communication provided to primary accessory device 120 by source device 110 specify a periodic communication cycle that includes a minimum continuous time period required for dedicated communication between the primary accessory device 120 and the secondary accessory device 130. In some embodiments, the time slot mask includes a set of at least two consecutive time slots indicated as unavailable for both transmission and reception by source device 110 per cycle of time slots, and primary accessory device 120 communicates with secondary accessory device 130 during the set of at least two consecutive time slots. In some embodiments, a length of the set of at least two consecutive time slots and a length of the cycle of time slots is based at least in part on minimum requirements for communication between primary accessory device 120 and secondary accessory device 130. In some embodiments, a guard period of the cycle of time slots specified by the time slot mask includes a second set of at least two consecutive time slots indicated as unavailable for transmission by source device 110 immediately precedes the set of at least two consecutive time slots indicated as unavailable for both transmission and reception by the source device 110. In some embodiments, the cycle of time slots includes a third set of consecutive time slots indicated as available for both transmission and reception by source device 110; and a length of the third set of consecutive time slots is sufficient to communicate at least one audio packet 202 from source device 110 to primary accessory device 120 in accordance with an Advanced Audio Distribution Profile (A2DP) of a Bluetooth communication protocol.

Figure 10:
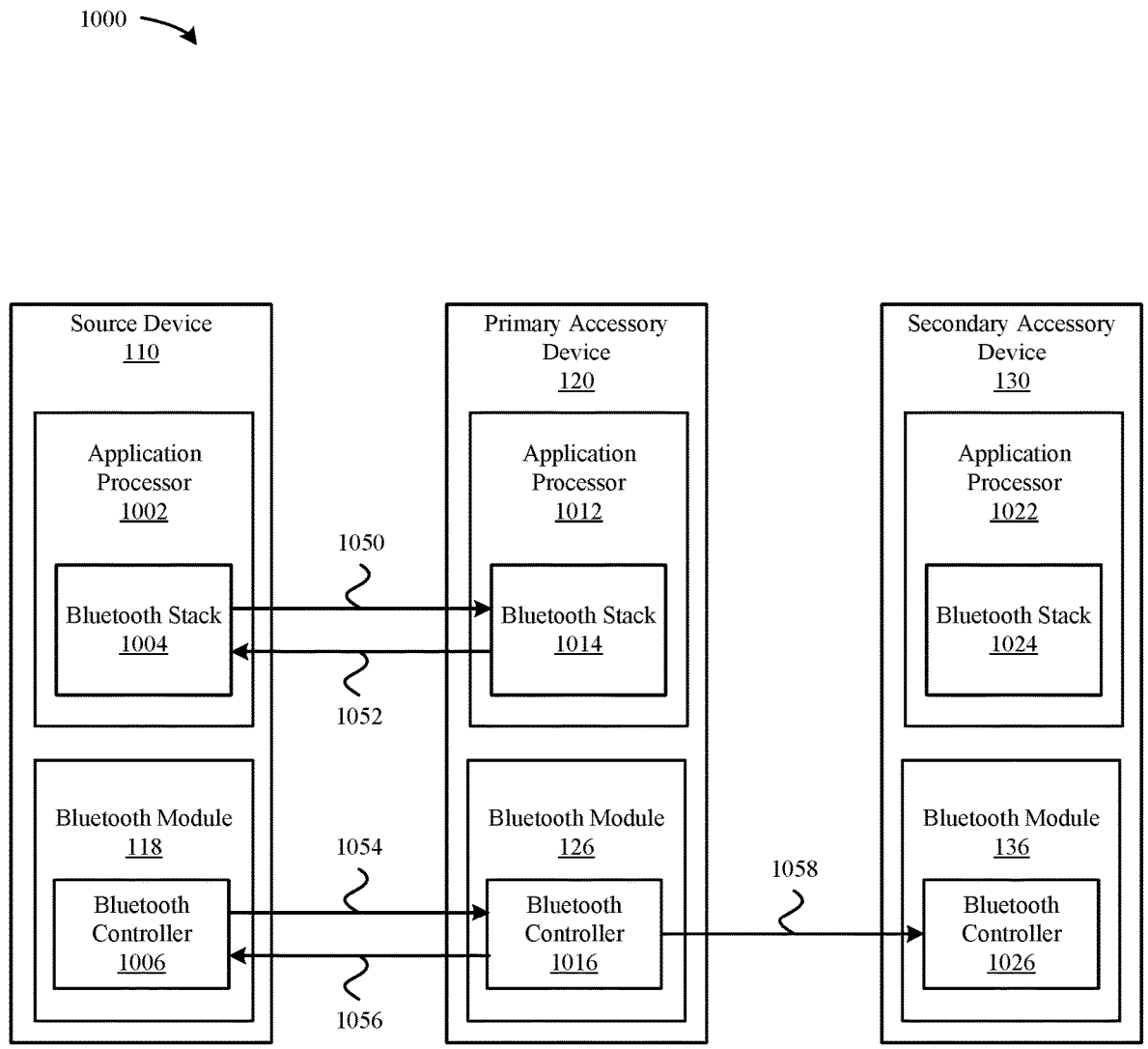
FIG. 10 illustrates a diagram of an exemplary sequence of communication between a source device, a primary accessory device, and a secondary accessory device to schedule communications, in accordance with some embodiments.

FIG. 10 illustrates a diagram 1000 of an exemplary sequence of communication between source device 110, primary accessory device 120, and secondary accessory device 130 to schedule communication between them. Source device 110 can include an application processor 1002 on which a Bluetooth stack 1004 can reside. Source device 110 can further include a Bluetooth module 118 on which a Bluetooth controller 1006 can reside. The application processor 1002 of source device 110 can communicate with an application processor 1012 of primary accessory device 120, e.g., via communication between the Bluetooth stacks 1004/1014. The Bluetooth module 118 of source device 110 can also communicate with a Bluetooth module 126 of primary accessory device 120, e.g., via communication between the Bluetooth controllers 1006/1016. Further, the Bluetooth module 126 of primary accessory device 120 can communicate with a Bluetooth module 136 of secondary accessory device 130, e.g., via communication between the Bluetooth controller 1016 of primary accessory device 120 and a Bluetooth controller 1026 of the Bluetooth module 136 of secondary accessory device 130. In some embodiments, secondary accessory device 130 includes an application processor 1022 on which a Bluetooth stack 1024 resides.

At 1050, the application processor 1002 of source device 110 sends a query to the application processor 1012 of primary accessory device 120, e.g., via communication between the Bluetooth stack 1004 and the Bluetooth stack 1014, to inquire about communication requirements for primary accessory device 120. For example, source device 110 can query for a time duration of a time period and a recurring cycle time for internal communication between primary accessory device 120 and secondary accessory device 130. At 1052, primary accessory device 120 can respond to the query by providing to source device 110 information on requirements for communication by primary accessory device 120, such as needed for internal communication with secondary accessory device 130. At 1054, source device 110 sends a SAM map to primary accessory device 120, the SAM map including indications for availability (or unavailability) for transmission/reception by the source device 110 to/from primary accessory device 120. The SAM map can be based at least in part on the requirements for communication provided by primary accessory device 120 to source device 110. In some embodiments, the Bluetooth stack 1004 of the application processor 1002 instructs the Bluetooth controller 1006 of the Bluetooth module 118 to send the SAM map to primary accessory device 120, e.g., to the Bluetooth controller 1016 of the Bluetooth module 126 of primary accessory device 120. In some embodiments, the SAM map is provided to primary accessory device 120 using link management protocol (LMP) messages in accordance with a Bluetooth communication protocol. At 1056, primary accessory device 120 acknowledges to source device 110 acceptance (or rejection) of the SAM map. When the SAM map is accepted, primary accessory device 120, at 1058, aligns communication for a repeated cycle of time slots marked for internal communication between primary accessory device 120 and secondary accessory device 130 in accordance with the SAM map. In some embodiments, the process illustrated in FIG. 10 is repeated when a new pair of accessory devices 120 establishes a communication link with source device 110. In some embodiments, when two or more pairs of accessory devices establish communication with source device 110, a common SAM map is provided to respective primary accessory devices 120 of pairs of accessory devices to align communication between primary accessory device 120 and secondary accessory device 130 of the pairs of accessory devices to use the same set (or at least an overlapping set) of time slots.

Figure 11:
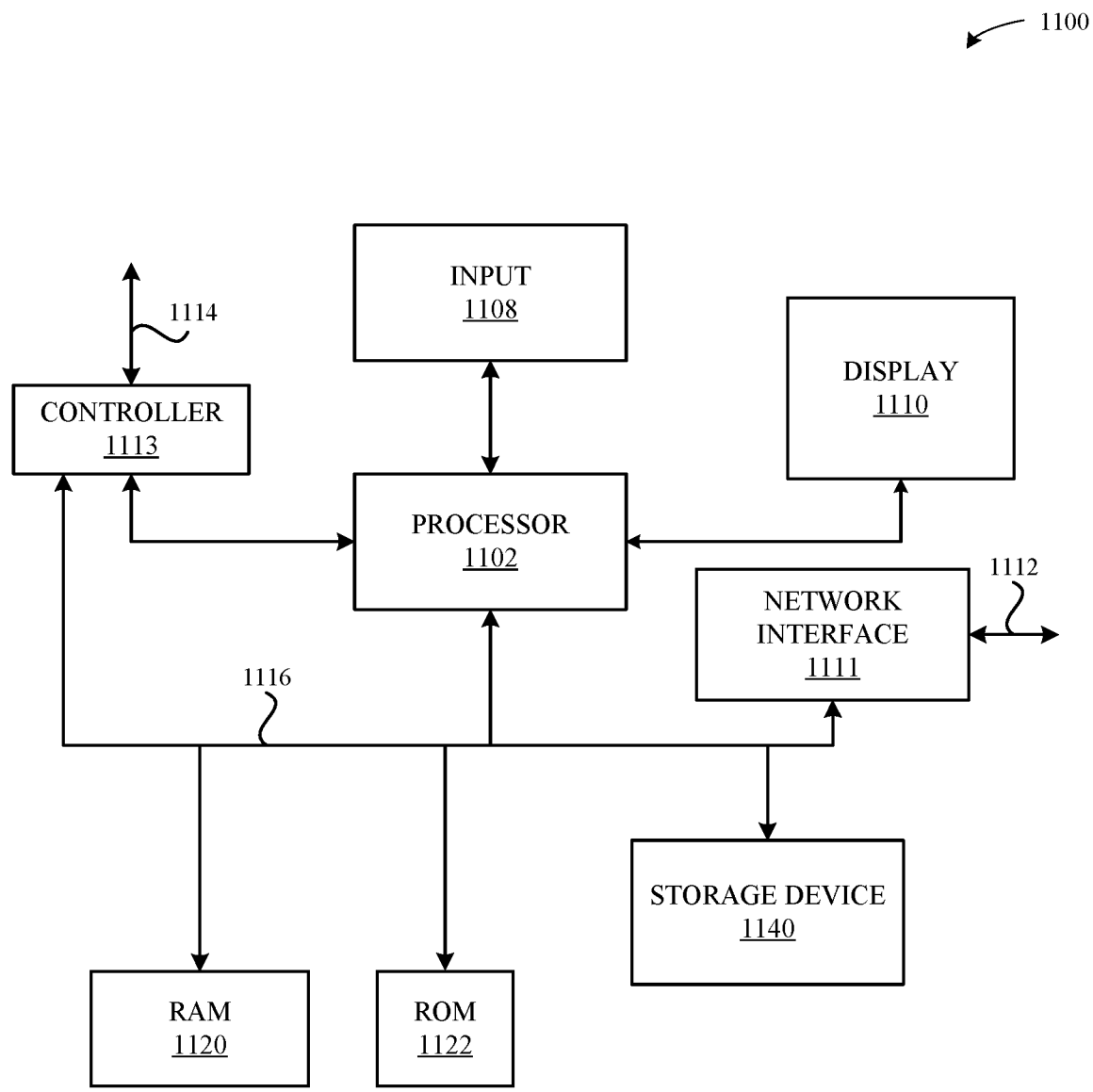
FIG. 11 illustrates an exemplary computing device that can be used to implement the various components described herein, in accordance with some embodiments.

FIG. 11 illustrates an exemplary computing device 1100 that can be used to implement the various components described herein, according to some embodiments. In particular, the detailed view illustrates various components that can be included in the source device 110, the primary accessory device 120, and/or the secondary accessory device 130 illustrated in FIG. 1. As shown in FIG. 11, the computing device 1100 can include a processor 1102 that represents a microprocessor or controller for controlling the overall operation of computing device 1100. The computing device 1100 can also include multiple processors in some embodiments. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 1110 (screen display) that can be controlled by the processor 1102 to display information to the user. A data bus 1116 can facilitate data transfer between at least a storage device 1140, the processor 1102, and a controller 1113. The controller 1113 can be used to interface with and control different equipment through and equipment control bus 1114. The computing device 1100 can also include a network/bus interface 1111 that couples to a data link 1112. In the case of a wireless connection, the network/bus interface 1111 can include a wireless transceiver.

The computing device 1100 also include a storage device 1140, which can comprise a single disk or a plurality of disks (e.g., hard drives), and includes a storage management module that manages one or more partitions within the storage device 1140. In some embodiments, the storage device 1140 can include flash memory, semiconductor (solid state) memory or the like. The computing device 1100 can also include a Random Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the computing device 1100.

The various aspects, embodiments, implementations or features of the described embodiments can be used separately or in any combination. Various aspects of the described embodiments can be implemented by software, hardware, or a combination of hardware and software. The described embodiments can also be embodied as computer readable code on a computer readable medium. The computer readable medium is any data storage device that can store data that can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A source device configured for communicating with at least two accessory devices, the source device comprising:
one or more antennas communicatively coupled to wireless circuitry configurable to transmit and receive radio frequency signals; and
processing circuitry comprising one or more processors communicatively coupled to a memory storing instructions that, when executed by the one or more processors, cause the source device to perform actions including:
obtaining a first communication time slot availability requirement from a first accessory device and a second communication time slot availability requirement from a second accessory device, wherein the first and second communication time slot availability requirements are associated with communication between the source device and the respective first and second accessory devices;
determining a first time slot mask and a second time slot mask, both first and second time slot masks based on both the first and second communication time slot availability requirements, each of the first and second time slot masks including at least a first time slot common to both first and second time slot masks for internal communication by each of the first and second accessory devices with respective additional accessory devices and at least a second time slot for communication between the source device and at least one of the first and second accessory devices;
providing the first time slot mask to the first accessory device and the second time slot mask to the second accessory device; and
communicating, by the source device, with the first accessory device in accordance with the first time slot mask and with the second accessory device in accordance with the second time slot mask.

2. The source device of claim 1, wherein the first accessory device comprises a pair of audio output devices.

3. The source device of claim 2, wherein the pair of audio output devices includes a primary audio output device and a secondary audio output device.

4. The source device of claim 3, wherein, in accordance with the first time slot mask:
the primary audio output device communicates with the secondary audio output device during a first set of time slots that includes the first time slot; and
the source device communicates with the primary audio output device during a second set of time slots that includes the second time slot.

5. The source device of claim 1, wherein the first time slot mask and the second time slot mask are identical.

6. The source device of claim 1, wherein the first time slot mask and the second time slot mask differ and include a common overlapping set of time slots dedicated for the internal communication by each of the first and second accessory devices with the respective additional accessory devices.

7. The source device of claim 1, wherein the first and second time slot masks:
specify guard periods that immediately precede time slots allocated for the internal communication by the first and second accessory devices with the respective additional accessory devices, and
disallow communication from the source device to the first and second accessory devices during the guard periods.

8. The source device of claim 7, wherein communication from the first accessory device or the second accessory device to the source device is allowed during one or more of the guard periods.

9. The source device of claim 1, wherein:
the first and second time slot masks each specify a communication time period sufficient to communicate at least one audio packet from the source device to the respective first and second accessory devices in accordance with an Advanced Audio Distribution Profile (A2DP) of a Bluetooth communication protocol.

10. An apparatus configured for operation in a source device, the apparatus comprising one or more processors communicatively coupled to a memory storing instructions that, when executed by the one or more processors, cause the source device to perform a method comprising:
obtaining a first communication time slot availability requirement from a first accessory device and a second communication time slot availability requirement from a second accessory device, wherein the first and second communication time slot availability requirements are associated with communication between the source device and the respective first and second accessory devices;
determining a first time slot mask and a second time slot mask, both first and second time slot masks based on both the first and second communication time slot availability requirements, each of the first and second time slot masks including at least a first time slot common to both first and second time slot masks for internal communication by each of the first and second accessory devices with respective additional accessory devices and at least a second time slot for communication between the source device and at least one of the first and second accessory devices;
providing the first time slot mask to the first accessory device and the second time slot mask to the second accessory device; and
communicating, by the source device, with the first accessory device in accordance with the first time slot mask and with the second accessory device in accordance with the second time slot mask.

11. The apparatus of claim 10, wherein the first accessory device comprises a pair of audio output devices.

12. The apparatus of claim 11, wherein the pair of audio output devices includes a primary audio output device and a secondary audio output device.

13. The apparatus of claim 12, wherein, in accordance with the first time slot mask:
the primary audio output device communicates with the secondary audio output device during a first set of time slots that includes the first time slot; and
the source device communicates with the primary audio output device during a second set of time slots that includes the second time slot.

14. The apparatus of claim 10, wherein the first time slot mask and the second time slot mask are identical.

15. The apparatus of claim 10, wherein the first time slot mask and the second time slot mask differ and include a common overlapping set of time slots dedicated for the internal communication by each of the first and second accessory devices with the respective additional accessory devices.

16. The apparatus of claim 10, wherein the first and second time slot masks:
- specify guard periods that immediately precede time slots allocated for the internal communication by the first and second accessory devices with the respective additional accessory devices, and
- disallow communication from the source device to the first and second accessory devices during the guard periods.

17. The apparatus of claim 16, wherein communication from the first accessory device or the second accessory device to the source device is allowed during one or more of the guard periods.

18. The apparatus of claim 10, wherein:
- the first and second time slot masks each specify a communication time period sufficient to communicate at least one audio packet from the source device to the respective first and second accessory devices in accordance with an Advanced Audio Distribution Profile (A2DP) of a Bluetooth communication protocol.

19. A method for scheduling communication between a source device and a first accessory device and a second accessory device, the method comprising:
by the source device:
- obtaining a first communication time slot availability requirement from the first accessory device and a second communication time slot availability requirement from the second accessory device, wherein the first and second communication time slot availability requirements are associated with communication between the source device and the respective first and second accessory devices;
- determining a first time slot mask and a second time slot mask, both first and second time slot masks based on both the first and second communication time slot availability requirements, each of the first and second time slot masks including at least a first time slot common to both first and second time slot masks for internal communication by each of the first and second accessory devices with respective additional accessory devices and at least a second time slot for communication between the source device and at least one of the first and second accessory devices;
- providing the first time slot mask to the first accessory device and the second time slot mask to the second accessory device; and
- communicating, by the source device, with the first accessory device in accordance with the first time slot mask and with the second accessory device in accordance with the second time slot mask.

20. The method of claim 19, wherein:
- the first accessory device comprises a pair of audio output devices including a primary audio output device and a secondary audio output device;
- the primary audio output device communicates with the secondary audio output device during a first set of time slots that includes the first time slot; and
- the source device communicates with the primary audio output device during a second set of time slots that includes the second time slot.

* * * * *